(12) United States Patent
Farley et al.

(10) Patent No.: US 8,469,824 B1
(45) Date of Patent: Jun. 25, 2013

(54) DEVICE AND METHOD FOR AN ELECTRONIC TAG GAME

(75) Inventors: Brian Farley, Dublin, CA (US); David Small, San Jose, CA (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 13/549,167

(22) Filed: Jul. 13, 2012

Related U.S. Application Data

(60) Continuation-in-part of application No. 10/951,025, filed on Sep. 27, 2004, now Pat. No. 7,632,187, and a division of application No. 12/335,201, filed on Dec. 15, 2008, now Pat. No. 8,303,421.

(51) Int. Cl.
| | |
|---|---|
| *A63F 9/24* | (2006.01) |
| *A63F 13/00* | (2006.01) |
| *G06F 17/00* | (2006.01) |
| *G06F 19/00* | (2011.01) |

(52) U.S. Cl.
USPC .................. 463/53; 463/49; 463/50; 463/51; 463/52; 463/54; 463/55; 463/56; 463/57; 434/11; 434/21

(58) Field of Classification Search
USPC ..................................... 463/49–57; 434/11, 21
See application file for complete search history.

(56) References Cited

U.S. PATENT DOCUMENTS

| | | | | |
|---|---|---|---|---|
| 4,695,058 | A * | 9/1987 | Carter et al. ........................ | 463/5 |
| 5,904,621 | A * | 5/1999 | Small et al. ...................... | 463/52 |
| 6,037,936 | A | 3/2000 | Ellenby et al. | |
| 6,524,189 | B1 * | 2/2003 | Rautila ........................... | 463/40 |
| 7,306,523 | B1 * | 12/2007 | Jeffway et al. .................. | 463/51 |

* cited by examiner

*Primary Examiner* — Omkar Deodhar
*Assistant Examiner* — Adetokunbo O Torimiro
(74) *Attorney, Agent, or Firm* — Perry Hoffman

(57) ABSTRACT

A device combining a gun and target for facilitating a game of tag using infrared light communications and augmented reality with one or more players is provided. The device includes infrared transmitters and infrared receivers to facilitate omni-directional two-way communication between two or more devices and a shaped housing facilitating handling of the device by a user. The housing includes a grip portion with a finger-operable trigger and a barrel portion. A mobile electronic device is used as an accessory to provide single player and multiplayer augmented reality game play and a user-interface including a display and a touch screen for programming the device and controlling various game and device functions.

20 Claims, 21 Drawing Sheets

BEACON SIGNATURES ARE IDENTIFIED BY THEIR
UNIQUE DOUBLE-LENGTH SYNC PULSES

"0" vs. "1" DATA PULSES ARE
DIFFERENTIATED BY THE DURATION
OF THE ACTIVE PHASE

BEACON SIGNATURE (TIMES IN MSEC):

\* = 1 msec for Data "0", 2 msec for Data "1"

TAG SIGNATURE (TIMES IN MSEC):

\* = 1 msec for Data "0", 2 msec for Data "1"

PACKET-TYPE BYTE SIGNATURE (TIMES IN MSEC):

\* = 1 msec for Data "0", 2 msec for Data "1"

DATA BYTE SIGNATURE (TIMES IN MSEC):

\* = 1 msec for Data "0", 2 msec for Data "1"

CHECKSUM BYTE SIGNATURE (TIMES IN MSEC):

\* = 1 msec for Data "0", 2 msec for Data "1"

Intelligent Rail
Gun with Accessories

DEVICE AND METHOD FOR AN ELECTRONIC TAG GAME

CROSS-REFERENCE TO RELATED APPLICATION

This application is a division and continuation-in-part of U.S. application Ser. No. 12/335,201 filed Dec. 15, 2008, which is a division and continuation-in-part of U.S. application Ser. No. 10/951,025 filed Sep. 27, 2004 which are both incorporated herein by reference in their respective entirety.

FIELD OF THE INVENTION

This invention relates to electronic games, and more particularly, to the combination of a device and method for facilitating a game of tag using infrared light communications and a video display shooting game simulating a game of tag using light detection technology wherein active, accessory based configuration is accomplished by communication between the device and the accessory, and also more particularly, to the combination of a device and method for facilitating a game of tag using infrared light communication and a mobile electronic device for enhanced display information and augmented reality gaming.

BACKGROUND OF THE INVENTION

As known in the art, infrared electronic games include communication devices for transmission and reception of infrared light signals, operating on the same principle as a remote control for a television. Infrared shooting games typically include two channels of infrared communication, namely, a channel for transmitting an infrared signal (i.e., a tag or shot) and a channel for receiving the transmitted infrared signals. Such infrared electronic shooting games involve two or more players, each equipped with an apparatus for sending infrared signals (e.g., a gun) and an apparatus for receiving infrared signals (e.g., a target), wherein the object of the game is to target and shoot opponents with an infrared signal, thereby scoring a "hit" or a "tag" until only one player or team remains in the game.

Such infrared electronic shooting games are relatively well known and have been available since about 1985. For example, one infrared electronic shooting game sold beginning in about 1986 by WORLDS OF WONDER™, permitted players to fire invisible beams at one another with each player being provided with a game unit for emission of an infrared light beam. In the WORLDS OF WONDER™ game, a target was affixed to each player in order to count the number of "hits" registered by the target associated with each player. In the WORLDS OF WONDER™ game, a player was tagged "out" when six hits were registered for that player. Other infrared electronic shooting games that are known include indoor arena games such as LAZER QUEST™ and the like.

The earliest infrared electronic games had difficulty operating in very harsh environments of direct and indirect sunlight, as well as in the environment of indoor lighting. As disclosed in U.S. Pat. No. 5,904,621 to Small et. al, for "Electronic Game With Infrared Emitter and Sensor," issued May 18, 1999, a series of encoded infrared light signals may be sent with an infrared transmitter for providing a "signature" signal substantially longer in duration than abrupt changes in ambient lighting conditions to facilitate gameplay. The disclosed encoding of infrared signals additionally enabled special game and/or device features. However, although such infrared encoding made games more interesting and/or challenging to the participants, infrared electronic shooting games available for purchase by the general public were somewhat limited in functionality and gameplay in comparison to indoor arena games. Therefore, in view of the foregoing, an improved device and method for an infrared electronic shooting game would be welcome.

Prior art infrared electronic games such as U.S. Pat. No. 4,695,058 to Carter III et. al, for "Simulated Shooting Game With Continuous Transmission of Target Identification Signals," issued Sep. 22, 1987, traditionally operated on two channels of infrared communication. In such systems, one signal was provided for transmitting an infrared signal while another channel received an infrared signal, thereby limiting the amount of data transmitted between two or more game apparatus. It would be desirable for an infrared electronic game to operate on more than two channels of infrared communication to allow for more complex game features and advanced user options to make the game more interactive and challenging.

Furthermore, it would be desirable for the game apparatus to provide an enhanced user interface for more interactivity between players and between a player and apparatus.

Other variations that can be used to further enhance the game playing experience include active accessory based configuration of hardware and software operation. That is, attaching or removing accessories alters both the look and the operation of the shooting device. This enhances the game by adding variations in weapon types and operation to create more realistic combat situations or more enticing fantasy combat situations. The accessory based configuration also enhances strategic aspects of the game playing experience by allowing players to balance the advantages and disadvantages of each configuration and make tactical decisions regarding specific combat situations. Audio feedback from firing and reloading sounds will also enhance the impression of changed performance.

Software configuration includes such things as firing modes, firing rates, the number of shots between reloads, the number of reloads, the damage per shot ("hit points"), the number of shields, the number of hits that will knock a player out of the game, and the sounds associated with specific events. The firing modes are used to simulate various types of weaponry mechanisms such as bolt-action sniper rifles, semi-automatic guns, burst fire guns such as assault rifles, fully-automatic machineguns, and shotguns.

Hardware configuration includes altering the physical characteristics of the infrared beam such as by changing the electrical current which controls the intensity of the infrared LED, or changing the arrangement of lenses which control the spread angle of the beam.

The prior art includes similar devices that have switches built into the weapon to alter the firing style between semi-automatic and fully automatic firing or to alter the characteristics of the infrared beam. Altering the firing style has been accomplished by using an electrical switch connected to the processor to set semi-automatic or fully-automatic modes and by using a sliding variable resistor to adjust the current and the intensity of the infrared beam. Altering the infrared beam has been accomplished mechanically by using a switch to move a pinhole blinder into or out of the optical path, by using a barrel extension to narrow the beam in a manner similar to using a pinhole, or by using a mechanical switch to move lenses into and out of the optical path.

The prior art does not include devices or systems that alter the number of hit points, provide for adjustable firing rates, allow variable numbers of shots between reloads, or utilize different sound effects for different firing modes, in response to varying physical configurations of the gun. Additionally, the prior art offers no strategic reason not to configure the device for a wide-beam, high power, fully-automatic mode because there is no significant disadvantage to the player for doing so. Moreover, switching between configurations in the prior art did not noticeably alter the appearance of the device.

It would be desirable for the game apparatus to offer the variation in both the software configuration and the hardware configuration described above that does not exist in the prior art. Additionally, it would be desirable for the game apparatus to have a different appearance and to use different sound effects for each variation in the software and hardware configurations.

Electronic shooting games have also been extremely popular for a single user in the form of devices that are attachable to a display, such as a television or a computer. In the prior art, such devices have typically used a photosensor equipped gun to process photo signals and to send processed information to the display. However, the prior art does not include such devices in combination with the type of infrared device described above.

It would be desirable to combine an infrared device for use with two or more players with a single player electronic shooting game device as just described and to provide the variability of configurations described above in a single device. Such a device would provide both increased realism and enjoyment and would also allow a more engaging means for the single player to become familiar with the simulated weapon's operation.

One such embodiment removably couples a mobile electronic device having a camera, such as an iPhone™ or an Android™ phone, to the infrared device and provides intelligent two-way communication between the two devices. The touch screen on the mobile electronic device is used for user input and as a heads up display for game related information originating from both the mobile electronic device and the infrared device. The camera, in combination with a sensor that produces data defining the real-time spatial orientation of the mobile electronic device, allows for single player and multiplayer augmented reality gaming along with traditional Lazer Tag™ where virtual objects and animations are superimposed on the real-time image captured by the camera and responsive to trigger pulls on the infrared device.

The prior art discloses Lazer Tag type games using a wireless telephone and standard communications technology. U.S. Patent Application No. US 2002/0111201 to Lang, for "Location-Based Game System", published Aug. 15, 2002 discloses a location-based game of laser tag where each player wears a laser tag sensor coupled to the user's wireless telephone and the wireless telephone provides location and other data, including number of hits, to a central computer of a wide area network. The network may include technology such as Bluetooth, WiFi and cellular, with the orientation of mobile phones using a common reference coordinate frame.

The prior art also discloses combining guns with cameras. U.S. Pat. No. 4,955,812 to Hill, for "Video Target Training Apparatus for Marksmen, and Method", issued Sep. 11, 1990 discloses a gun-resembling member with an optical system that captures an image through the sight at the instant of pulling the trigger. U.S. Patent Application No. US 2004/0031184 to Hope, for "Optical Imaging Device for Firearm Scope Attachment", published Feb. 19, 2004 discloses an electro-optical recording device, such as a digital still camera or a video recorder, optically connected to the scope sight of a firearm that operates when the trigger of the firearm is actuated. U.S. Patent Application No. US 2005/0252063 to Flannigan, for "Imaging System for Optical Devices", published Nov. 17, 2005 discloses an imaging system for use with an optical device that splits an image into two identical images, one to view and one to record. This system can be used in the scope sight of a firearm. U.S. Pat. No. 7,194,204 to Gordon, for "Photographic Firearm Apparatus and Method", issued Mar. 20, 2007 and U.S. Patent Application No. US 2006/0201046 to Gordon, for "Photographic Firearm Apparatus and Method", published Sep. 14, 2006 disclose a telescopic firearm scope/sight which is fully integrated with a compact digital camera, and which has size, shape and weight characteristics that are substantially the same as those of a conventional, camera-less telescopic scope that is used to photograph a target proximate the instant at which the target is fired upon.

The prior art further discloses systems and methods embodying how the infrared device and the mobile electronic device may communicate using the audio/video/data ports on the two devices. U.S. Pat. No. 6,975,853 to Fang et al., for "Personal Identification Device for Mobile Telephone", issued Dec. 13, 2005 discloses an external device that connects to the headphone jack of a mobile telephone and simulates voice and data activity to convey a unique identification code. Other prior art relates to electronic devices with an A/V jack that receives a peripheral device and discriminates the functionality of the peripheral device. U.S. Patent Application No. US 2010/0000862 to Rao, for "Integrated Blood Glucose Measurement Device", published Jan. 7, 2010 discloses a blood glucose measuring device communicatively coupled to a web enabled portable device to allow for data transfer between the devices. U.S. Patent Application No. US 2010/0249965 to Rao et al., for "Integrated Blood Glucose Measurement Device", published Sep. 30, 2010 discloses a method of transferring data between a diagnostic measurement device and a portable consumer electronic device by communicatively coupling the devices through the audio port of the consumer electronic device.

Other prior art also discloses combining a mobile electronic device, such as a smart phone, with a toy gun, using high frequency sound and a pressure sensitive trigger switch. Others mount a smart phone on top of the toy gun so that a trigger pull causes plastic hammers to tap the touch screen and cause a shot to go across the display, such as finger touches on the touch screen would.

What would be desirable and what the prior art does not disclose is a traditional multiplayer Lazer Tag™ game enhanced by using a mobile electronic device, such as an iPhone™ or an Android™ phone, to provide single user and multiuser augmented reality and a heads up display. As stated above, one such embodiment removably couples the mobile electronic device having a display showing the real-time surroundings using a camera or some other means to the infrared device and provides intelligent two-way communication between the two devices. The touch screen on the mobile electronic device is used for user input and as a heads up display for game related information originating from both the mobile electronic device and the infrared device. The device, in combination with a sensor that produces data defining the real-time spatial orientation of the mobile electronic device, allows for single player and multiplayer augmented reality gaming along with traditional Lazer Tag™ where virtual objects and animations are superimposed on the real-time image captured by the camera or some other means and responsive to trigger pulls on the infrared device. This and other embodiments are ideal for using single player augmented reality to train for a multiuser Lazer Tag™ game in a way unknown in the prior art.

SUMMARY OF THE INVENTION

Embodiments of the present invention provide a gun and target device for facilitating a game of tag using infrared light communications between a plurality of players, each player being equipped with a gun and target device. Embodiments of the present invention also allow a single user to use the invention as a video game by attaching the invention to a television or a computer.

As described, the gun and target device includes a pistol-shaped housing with a grip portion with a finger-operable trigger button, a barrel portion and a user-interface including a display such as an LCD screen, and a keypad for programming the device and controlling various game functions. The pistol-shaped housing also encases an electronic controller coupled to two infrared transmitters and two infrared receivers. The first infrared transmitter and first infrared receiver are positioned at the barrel portion of the gun housing and include light lenses for both the source and the detector. The directional infrared source transmits a long-range infrared signal to a remote game participant and the directional infrared detector receives an acknowledgment signal therefrom.

The second infrared transmitter and second infrared receiver are positioned within a hemispherical-shaped dome on the top portion of the gun housing and comprise an omnidirectional infrared source and an omnidirectional infrared detector. The omnidirectional source regularly transmits a short-range infrared signal which communicates team affiliation and other data to one or more remote game participants' devices, allowing said remote game participants' devices to indicate both the presence of the first device and some information about the first device's role and status within the game.

The usage of two transmitters and two receivers each with different characteristics enables each gun and target device to communicate four channels of infrared communication, thus allowing more complex gaming features and advanced user options to make the game more interactive and challenging. The embodiment includes the traditional scheme of communication involving directing a directional infrared signal at an opponent's omnidirectional detector. This action is basis for a "hit" or "tag" being applied to a player. The additional infrared channels allow for more communication (identification, location, statistical and other data) to take place between players before, during, and after a game of infrared electronic tag. For example, data transmitted via the omnidirectional transmitter of a first unit, upon being received by the directional receiver of a second unit, indicates to the second unit that it has been successfully aimed at the first unit and can expect any tags fired by the second unit to be received by the first unit. If the data transmitted from said first unit is indicative of a hit having just been taken, and if the second unit has just fired a tag, the second unit may reasonably conclude that it has successfully tagged the first unit. If the second unit receives this data on its omnidirectional receiver rather than on its directional receiver, then it may reasonably conclude both that it is not aimed at the first unit, and that the first unit is in close proximity to the second unit. The communications between omnidirectional transmitter of a first unit and omnidirectional receiver of a second unit further enable a more convenient means of establishing infrared communication between the two units for exchange of non-tag information so that the users do not have to aim the two units at one another with the precision needed for communicating tags, but instead need only to come within reasonable proximity to one another to facilitate such communications.

The electronic controller within the gun and target apparatus allows for several modes of gameplay for the players to utilize. Using the LCD screen and user-operable buttons, the player that decides to begin a game of infrared electronic tag (a "host" player) chooses the parameters that will govern the rules of the game. Once determined, these parameters are sent from the host player's gun and target device to the other players' gun and target devices via short-range infrared signals. This wireless communication eliminates errors that might otherwise lead to different players not setting identical parameters on their own device and eliminates the need for all players to have advanced knowledge of how to configure the controller. Further, the use of the short-range omnidirectional transmitters and the omnidirectional receivers for this process eliminates the need for the players to maintain proper aim throughout this process.

During game play, the infrared communication between devices provide each player with active feedback. For example, a player will be notified by the gun and target device when that player was tagged by an opponent, or whether that player tagged an opponent successfully. A player will be notified by the device whether a targeted remote player is a "friend" or a "foe." A player will be notified when a "foe" is in close range of that player, indicating a proximity warning. The electronic controller stores data during gameplay, including a record of tags received and other performance statistics. After a game of infrared electronic tag, the electronic controllers in each players' devices are able to share stored data about the players' performance during the game.

The gun and target device also optionally includes a device, known as a heads-up-display (HUD) or head-mounted display (HMD), adapted for wearing on the head of a player, the HMD device removably coupled to the pistol-shaped housing. The HMD device includes a transparent eyepiece having a see-through display projected by an optical combiner and partial mirror, thereby allowing the player to acknowledge signals from the gun and target device without taking their attention from the gameplay action.

Briefly summarized, the present invention relates to a device combining a gun and target for facilitating a game of tag using infrared light communications between a two or more players, each player being equipped with the device. The device includes two infrared transmitters and two infrared receivers and a shaped housing facilitating handling of the device by a user. The housing includes a grip portion with a finger-operable trigger, a barrel portion and a user-interface including a display and a keypad for programming the device and controlling various game and device functions. A first infrared transmitter is disposed at the barrel portion for transmitting a directional infrared signal to another game participant and a first infrared receiver including collimating optics is disposed at the barrel portion for receiving an acknowledgment signal therefrom in response to the transmitted directional signal. A second infrared transmitter and second infrared receiver are disposed on the housing to facilitate omnidirectional two-way communications between two or more devices. The omnidirectional transmitters and receivers facilitate communications between game players before, during, and after a game of infrared electronic tag such as game setup, player identification and gameplay analysis. Thus, the device operates to enable complex gameplay and advanced user options to make the game more interactive and challenging.

The present invention also provides for active accessory based configuration of the gun hardware and software operation, allowing for increased variation in weapon behavior and appearance.

In a first preferred embodiment, accessories may be removably coupled to the gun and may include choices between one of two barrels, one of two grips, and one of two sights. Upon coupling one or more accessories to the gun, a unique combination of switches are closed thus generating identifying signals which will be received by a first electronic controller housed in the gun to identify which accessories are attached. Consequently, based on the combination of attached accessories, the first electronic controller may determine how the physical configuration will affect the gun's behavior by altering the software configuration to match the hardware configuration and physical appearance. This system is called an "active rail" system as the combination of accessories attached to the gun's mounting rails is actively sensed by the first electronic controller.

In a second preferred embodiment, an accessory may contain a second electronic controller so that when the accessory is attached to the gun there will be a bidirectional channel facilitating communication between the first electronic controller and the second electronic controller. Further, the gun may provide power to the accessory by way of the connection so that the accessory need not contain a power source of its own. This setup allows intelligent processor-to-processor communications between the gun and the accessory and is known as an "intelligent rail" system. As such, this system provides flexibility and may allow the accessory to perform communications based functions such as game definition, scoring, "healing" players, re-arming in games with limited ammunition, and the ability to switch between different infrared LEDs and optical paths.

Additional characteristics of a gun barrel accessory in either preferred embodiment may include additional infrared light emitting diodes (IRLED's) and/or additional lenses in the gun barrel accessory as well as circuitry to inhibit the generation of an infrared signal from the gun so that such a signal may instead be generated in the gun barrel accessory. This configuration may allow for a greater variation in the beam pattern of the infrared signals.

The aforementioned accessories may be interchangeable during game play to alter the hardware and software operation during a particular game. Thus, the player may have added strategic considerations during a game by being able to choose the best characteristics of the simulated weapon that fit a particular battle situation. The preferred embodiment may contain memory for the purpose of recording the number of times a given accessory is used during a particular game. This data may be used by the accessories to record or limit the number of uses of specific accessories by each player during the game.

The present invention further provides for an accessory which allows the game apparatus to be used as an electronic shooting game for a single user when the apparatus is attached to a display, such as a television or a computer. That is, the present invention may be used as a video game for a single user.

In a preferred embodiment, a light detector is built into the housing of an accessory which mounts to the gun below the barrel. The light detector may be used to sense at a distance segments on the screen of a raster scan display. The preferred embodiment also has a video game processor built into the housing for generating video output to display simulated players and scenery on the screen. A first-live-player-operable button may be used to generate a trigger signal to the video game processor. The video game processor may then use the light detector and the trigger signal to determine the orientation of the weapon housing and where the gun was pointing when the player pulled the trigger. Both video and audio output may be transmitted to the raster scan display using standard RCA cables. It will be appreciated by those skilled in the art that the technology for displaying video images and for detecting the point-of-aim of video game guns used in conjunction with such displays is constantly advancing, and that the description specifically of raster-scan CRT type displays and photocell detectors is not intended to limit the preferred embodiment to only this specific technology.

A simulated player data structure may operate with the video game processor to generate video output displaying at least one of the simulated players shooting at the live player. The data structure will determine whether the simulated player hit the live player. A memory data structure may also operate with the video game processor to generate video output showing the real time damage effects to the scenery.

In another embodiment using an intelligent rail system, the hand held device is used for an infrared shooting game having one or more participants where a single player or multiple players may use augmented reality to shoot virtual objects and practice for multiuser games. The hand held device has a shaped housing with a first directional infrared transmitter disposed within the housing for transmitting directional IR data using a narrow light beam, a first omni-directional field of view receiver disposed within the housing to receive IR data, a first electronic controller disposed within the housing and a first apparatus removably coupled to the housing. The first apparatus, which may be a smart phone such as an iPhone™ or an Android™ phone, has a display and a second electronic controller. When the first apparatus is coupled to the housing, a carrier signal is sent between the first electronic controller and the second electronic controller for handshake communications.

During operation, a sensor is used that produces data defining the real-time spatial orientation of the first apparatus. This data may be GPS data or some other relative coordinate based data or the like. A first data structure is used for storing the data defining the real-time spatial orientation of the first apparatus. A second data structure is used for storing data defining one or more virtual objects, and a third data structure is used for storing data defining the real-time spatial orientation of the one or more virtual objects relative to the real-time spatial orientation of the first apparatus. A first memory is used for storing a real-time image of the field of view, and a second memory is used for storing a real-time image of the one or more virtual objects that are positioned such that the real-time spatial orientation of the one or more virtual objects relative to the real-time spatial orientation of the first apparatus is within the field of view. A third memory stores a software program controlled by the second electronic controller that causes the image in the first memory to be shown on the display and the image in the second memory to be superimposed over the image in the first memory on the display.

In some embodiments, the shaped housing may have a body section, a barrel section and a grip section. A first infrared transmitter is located in the barrel section and produces a substantially directional beam projecting forward from the housing. A first infrared receiver is located in the barrel section and has a narrow field of view looking forward of the housing and parallel to the beam of the first infrared transmitter. A second infrared transmitter is located on top of or within the body section and has an omni-directional pattern which illuminates an area approximately 360 degrees about the body. A second infrared receiver is located on top of or within the body section and has an omni-directional view approximately 360 degrees about the housing. A first electronic controller is disposed within the housing and connected electrically to the first and second infrared transmitters and first and second infrared receivers. An input device is connected to the first electronic controller and receives commands from the human player, and an output device is used for outputting status information to the human player.

A bidirectional channel facilitates communication between the first electronic controller and the second electronic controller. The hand held device may have a fourth data structure for storing data defining a real-time virtual shot trajectory originating from the hand held device and in response to a first signal from the first electronic controller to the second electronic controller, the software program causes a shot image to travel across the display along the real-time virtual shot trajectory superimposed over the image shown on the display. When the shot image crosses a virtual object, the software program causes a graphical animation to appear on the display superimposed over the real-time image of the field of view. During game play, the one or more virtual objects travel within the display, and the software program causes the one or more virtual objects to shoot a virtual shot towards the participant using the hand held device. The combination of the data in the first data structure, the second data structure and the third data structure determine whether the participant using the hand held device is hit by the virtual shot from the virtual object. In response to a second signal from the first electronic controller to the second electronic controller, the software program receives game-related data sent from the first electronic controller to the second electronic controller and superimposes the game-related data over the real-time image of the field of view. Thus, the device provides for single player or multiplayer augmented reality gaming in conjunction with multiplayer Lazer Tag.

In multiplayer augmented reality games, the real-time image of the field of view is augmented by displaying a virtual shot in response to a first communication from the first controller to the second electronic controller. The field of view is also augmented by displaying a hit animation in response to a second communication from the first controller to the second electronic controller. For example, during the game, a virtual shot will be displayed in response to a trigger pull from a first player. If a second player's gun is within the firing range of the first player's gun, then a hit will register on the first player's gun. The first controller will communicate with the first apparatus, which will display an animation, such as an explosion. Further, a heads up display appears on the display in response to a third communication from the first electronic controller to the second electronic controller.

The hand held device may use a cable to couple the first apparatus to the hand held device as the bidirectional channel facilitating communication between the first electronic controller and the second electronic controller. The hand held device may further use a speaker to provide audio feedback controlled by the software program and use a touch screen display for user input through the second controller.

In some embodiments, a second apparatus may be removably coupled to the device, the second apparatus sending an identifying signal to the first electronic controller when coupled to the device, which causes the first electronic controller to send a third signal from the first electronic controller to the second electronic controller and wherein in response to the third signal, modifies the behavior of game play.

In sum, the present invention relates to a combination of an infrared shooting device for game play between two or more people and a light detecting shooting device for single player video game play. The invention also features accessory based hardware and software configuration of the gun to provide greater variation in the variables defining the characteristics of the weapon. Such accessory based configurations can include embodiments using a display, touch screen and camera to provide augmented reality to enhance the traditional shooting game.

DESCRIPTION OF THE EMBODIMENTS

Figure 1:
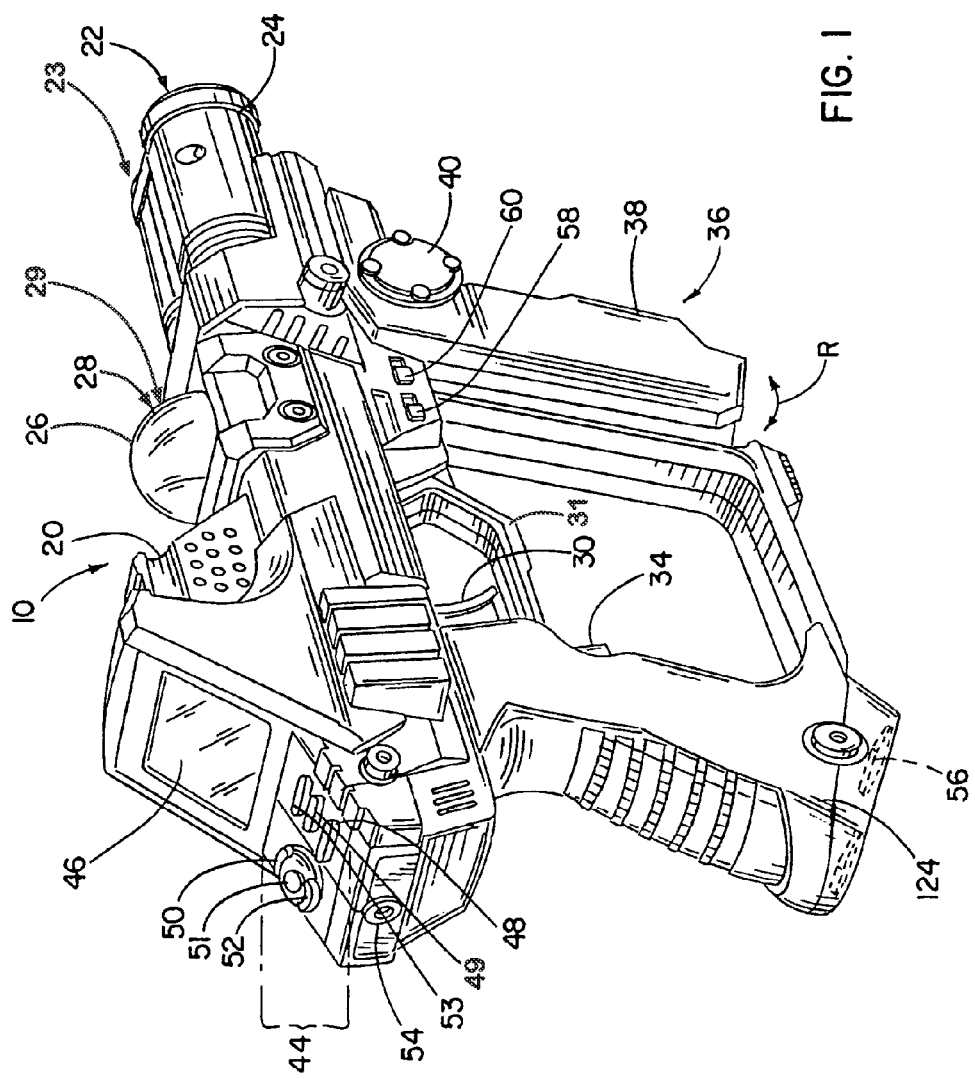
FIG. 1 is a first perspective view of an exemplary infrared shooting game device.
Figure 2:
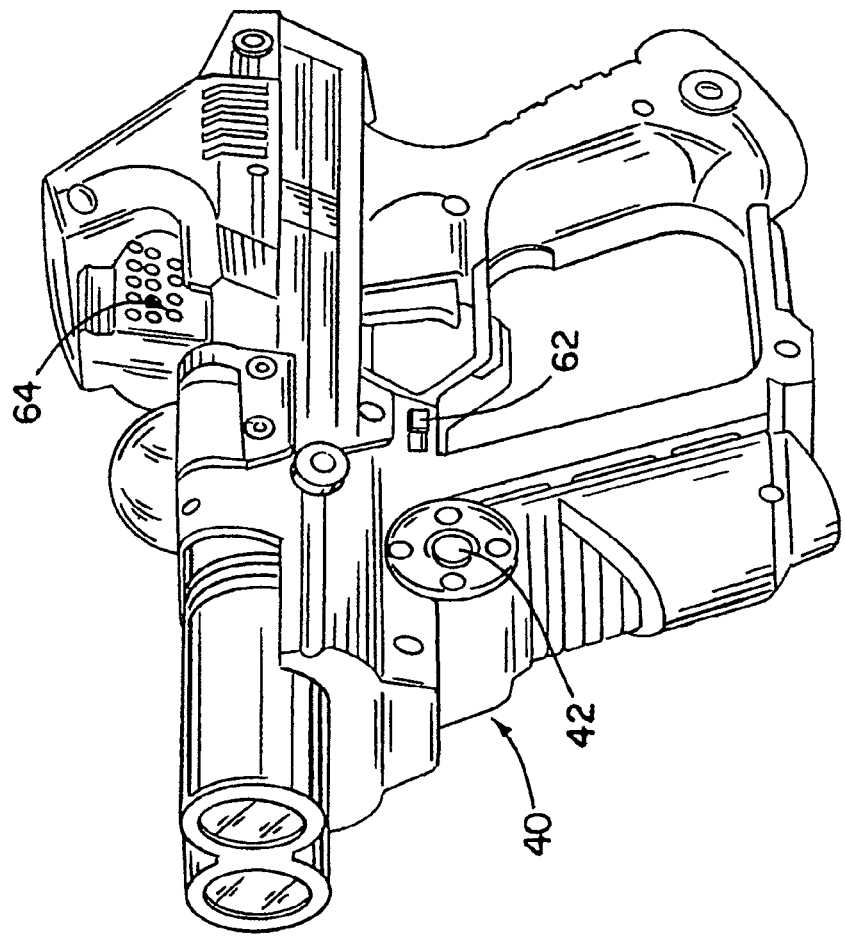
FIG. 2 is a second perspective view of the device of FIG. 1.

Referring now to the drawings and especially FIGS. 1 and 2, an exemplary combination gun and target device for facilitating a game of tag using infrared light communications is shown. The device 10 includes a shaped housing 20, which substantially encloses the device electronics shown in FIGS. 4A, 4B and 5. The housing 20 is generally pistol or gun-shaped including a barrel portion 24 with two gun barrels positioned along a parallel axis, as depicted in FIGS. 1 and 2. A first lens is disposed at the end of a first barrel and a second lens is disposed at the end of a second barrel. An infrared light source such as a light emitting diode (LED) or the like is disposed behind the first lens within one gun barrel of the barrel portion 24 and an infrared detector such as an infrared photodetector or the like is disposed behind the second collimating lens within the other gun barrel of the barrel portion 24. The lenses may be collimating lenses or the like to provide relatively narrow or otherwise focused beams for the infrared diode and narrow field of view for the photodetector. The first and second lenses are disposed adjacently within their respective gun barrels such that the directional infrared source and the directional infrared detector are oriented parallel to each other along the barrel portion 24, providing a directional infrared transmitter 23 aligned in a parallel manner with a directional infrared receiver 22 which operate to transmit and receive infrared signals in a directional manner to and from a specific similar device operated by a remote player. For example, directional transmitter 23 may transmit infrared signals to a remote player's device that is aligned with the barrel portion 24 and directional receiver 22 may receive infrared signals sent from the remote player's device in response to the transmitted signals. The lenses enable the device 10 to transmit and receive infrared signals across considerable distances (e.g., three hundred feet). Various construction techniques may be used to arrange the lenses, IR LEDs, and IR receivers or detectors. For instance the lenses and tubes can be arranged horizontally or vertically with respect to one another or the two tubes can be combined into one tube. Similarly the columniation of the transmitted light beam and field of view of the receiver could be accomplished using a single lens configuration.

The IR transmitter/receiver dome 26 contains an omnidirectional infrared source and an omnidirectional infrared detector. As shown in FIGS. 1 and 2, the housing 20 includes a generally hemispherical-shaped dome 26 positioned on the top surface of the housing 20. The dome 26 is made of an infrared transparent material and encloses the omnidirectional infrared transmitter 28 and the omnidirectional infrared receiver 29. As described hereafter, the omnidirectional infrared transmitter 28 includes an arrangement of infrared light emitting diodes for providing infrared signal transmission approximately 360 degrees about the device 10. Similarly, the omnidirectional infrared receiver 29 includes an arrangement of photodetectors within the dome 26 for providing infrared signal reception approximately 360 degrees about the device 10. Additionally, dome 26 may include one or more lenses relative to the omnidirectional source and detector and one or more visible light indicators such as LEDs for indication of a hit having been received by the device.

The device 10 includes a first finger-operable trigger 30 positioned on a grip portion 124 of the housing and is optionally protected against accidental activation by trigger guard 31. When a player depresses first finger-operable trigger 30, an infrared signal is transmitted by the directional transmitter 23 in the direction which the gun barrel 24 was aimed. If aligned properly with a remote player's device 10, particularly the omnidirectional infrared receiver 29, a "tag" will be applied to that remote player, the basic object of the game of electronic infrared tag being to tag one's opponents while avoiding being tagged by one's opponents. Further, the grip portion 124 may include a second finger-operable trigger 34 proximate the first finger-operable trigger 30. The second finger-operable trigger 34 operates to actuate a "shield" function known in the art so that the device 10 may temporarily ignore tags received from other devices. As shown in FIG. 1, the triggers 30, 34 may be positioned on grip portion 124 in such a way as to be operated in an ergonomic manner by two adjacent fingers of the player's hand gripping the grip portion 124. Alternatively, the second finger-operable trigger 34 ("shield trigger") may be located on the inner surface of the trigger guard 31 such that the "firing" trigger 30 is activated by squeezing the trigger finger versus the "shield" trigger 34, which is activated by pressing forward with the trigger finger. A second grip portion 36 is positioned forward of grip portion 124 and includes a movable lever 38. Lever 38 may be spring loaded or otherwise biased to arcuately pivot a short distance about cylinder part 40 as shown by double-headed arrow "R". A player operates lever 38 by grasping and squeezing grip portion 36 with the user's second hand thereby actuating a reload function of the device 10 such that the user's supply of infrared ammunition is replenished. This is somewhat analogous to inserting a new clip of ammunition into a gun or quickly reloading the clip. As shown in FIG. 2, function button 42 is positioned on the cylinder part 40 on the left side of the housing 20. Operation of function button 42 is multi-purpose, enabling special device features. For example, a user pressing the function button 42 while pressing trigger 30 may add "mega-tag" points to the next tag transmitted or launched by the device 10. Additionally, by holding both grip portions 124, 36 the user may enjoy better stabilization, aim and control of the device 10.

Located at the rear portion of the housing 20 is a plurality of buttons 48-53 providing a keypad 44. Adjacent the keypad 44 is a display 46, which is angled for facilitating viewing by the user. The keypad 44 and display 46 together provide an interactive, programmable user interface for viewing or programming game parameters. The buttons 48-53 allow the user to navigate through options and information among other things displayed on display 46 in the form of a menu-driven interface structure or the like before, during, and after gameplay. Located just below the keypad 44 is a compartment that is closed with a removably-fastened lid 54. The compartment houses the device's power supply, which in an exemplary embodiment includes a plurality of common-sized (e.g., AA) batteries. The compartment may be opened and closed for the purpose of installing and replacing the batteries, which may be disposable or rechargeable. Located on the underside of grip portion 124 are two interfaces or connectors 56. Each connector 56 may be employed to couple an accessory or supplemental device to the device 10. One such accessory that may be removably coupled to the device 10 via connector 56 is a display interface described hereinafter as a head-mounted display (HMD) device.

Figure 3:
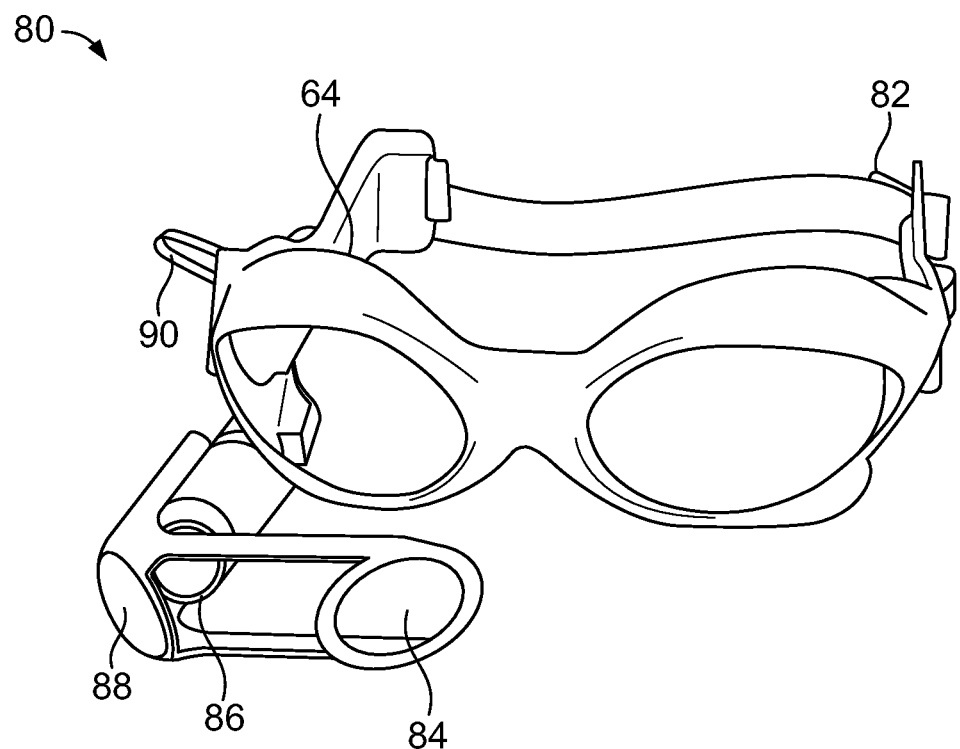
FIG. 3 is a perspective view of an exemplary optional display device for use with the device of FIGS. 1-2.

As depicted in FIG. 3, the HMD device 80 resembles a pair of eyewear such as sunglasses and is designed to fit around a user's head. As is generally known in the art, the HMD 80 is used as a head-mounted optical system allowing the user to enjoy gameplay information in his or her field of view while playing the game. The HMD device 80 includes a mirror 88 and a combiner 84 in order to "wrap" an optical display around the side of the user's head. An adjustable fastening strap 82 fits around the back of a user's head, such that the user looks through the lenses of the glasses and the see-through combiner 84 that is oriented in front of the glasses for viewing. Optical projector 86 is oriented along the side of the user's head and projects an iconic display or the like to facilitate non-line-of-sight communications with other game participants and the like. The HMD 80 may communicate with the device 10 via a cable 90 that may be removably attached (not shown) to the connector 56.

An Indoor/Outdoor switch 60 is located on right side of the housing 20 near grip portion 36, as shown in FIG. 1. The Indoor/Outdoor switch 60 decreases the intensity of the tag signature or alternately may function to decrease the sensitivity of the omnidirectional infrared receiver 29 for use of the device 10 indoors, where ambient infrared energy is not a significant factor to affect transmission and receipt of infrared signals but sensitivity to low-power signals reflecting from nearby walls would diminish game play. A HMD brightness switch 58, located just behind switch 60, controls the brightness of the HMD display. The speaker switch 62 is located on the left side of the housing 20 (FIG. 2) near grip portion 36. This switch enables and disables the audio speaker 64 of the device 10 to produce and silence respectively audible cues, sound effects and the like produced by the speaker 64.

Figure 4A:
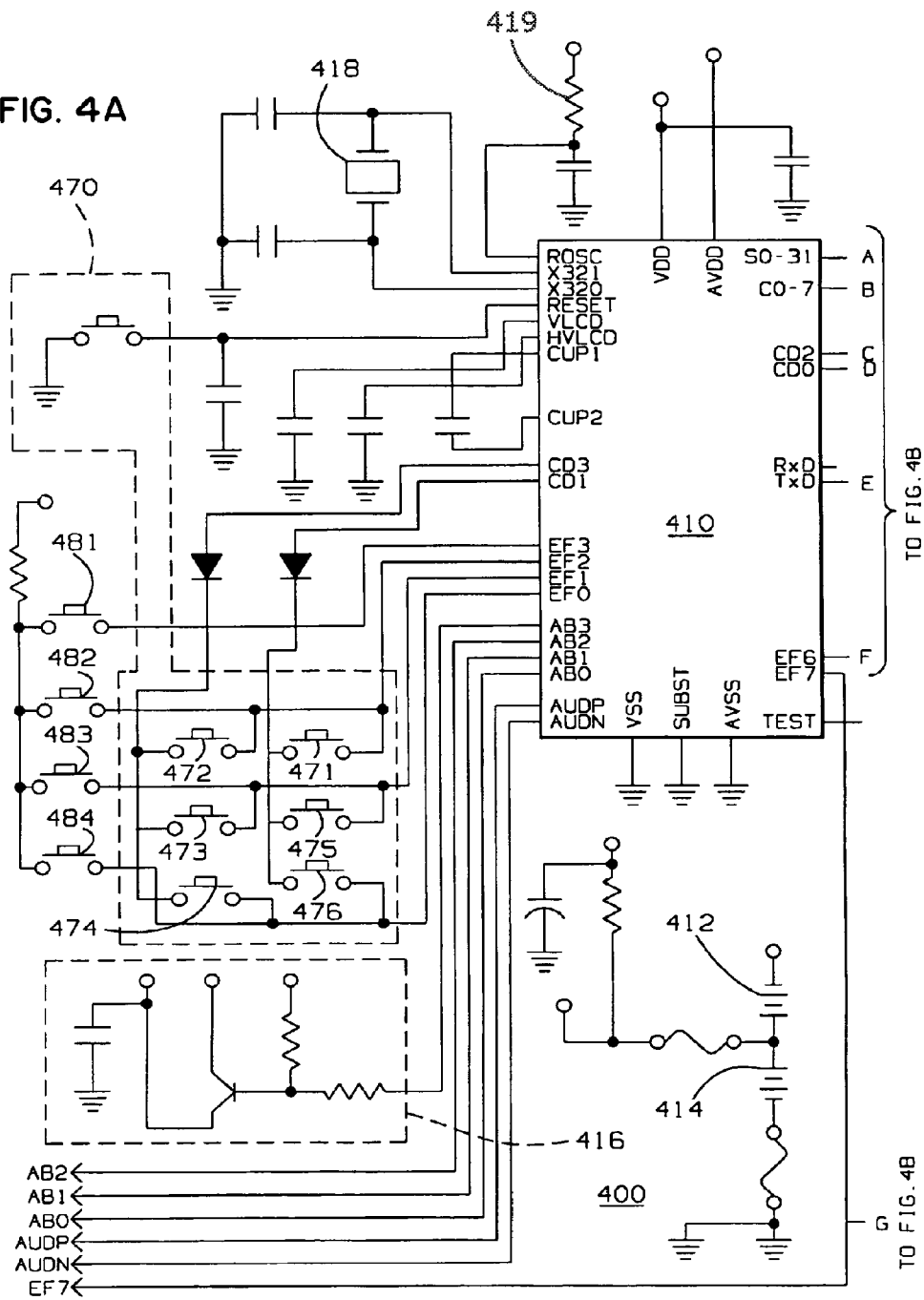
FIGS. 4A, 4B and 5 are schematic diagrams of an exemplary electrical circuit in accordance with the devices of FIGS. 1-3.
Figure 4B:
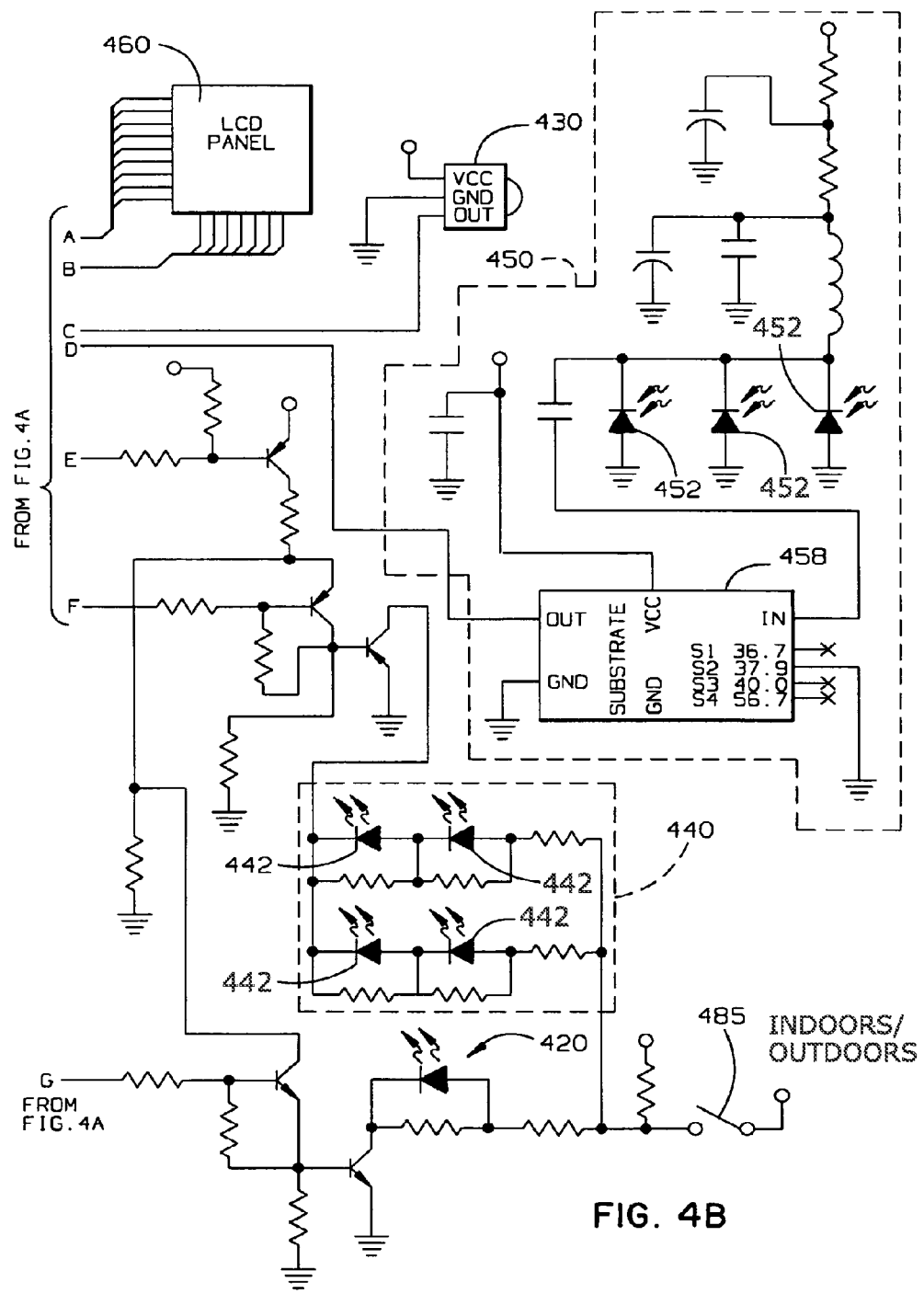
Figure 5:
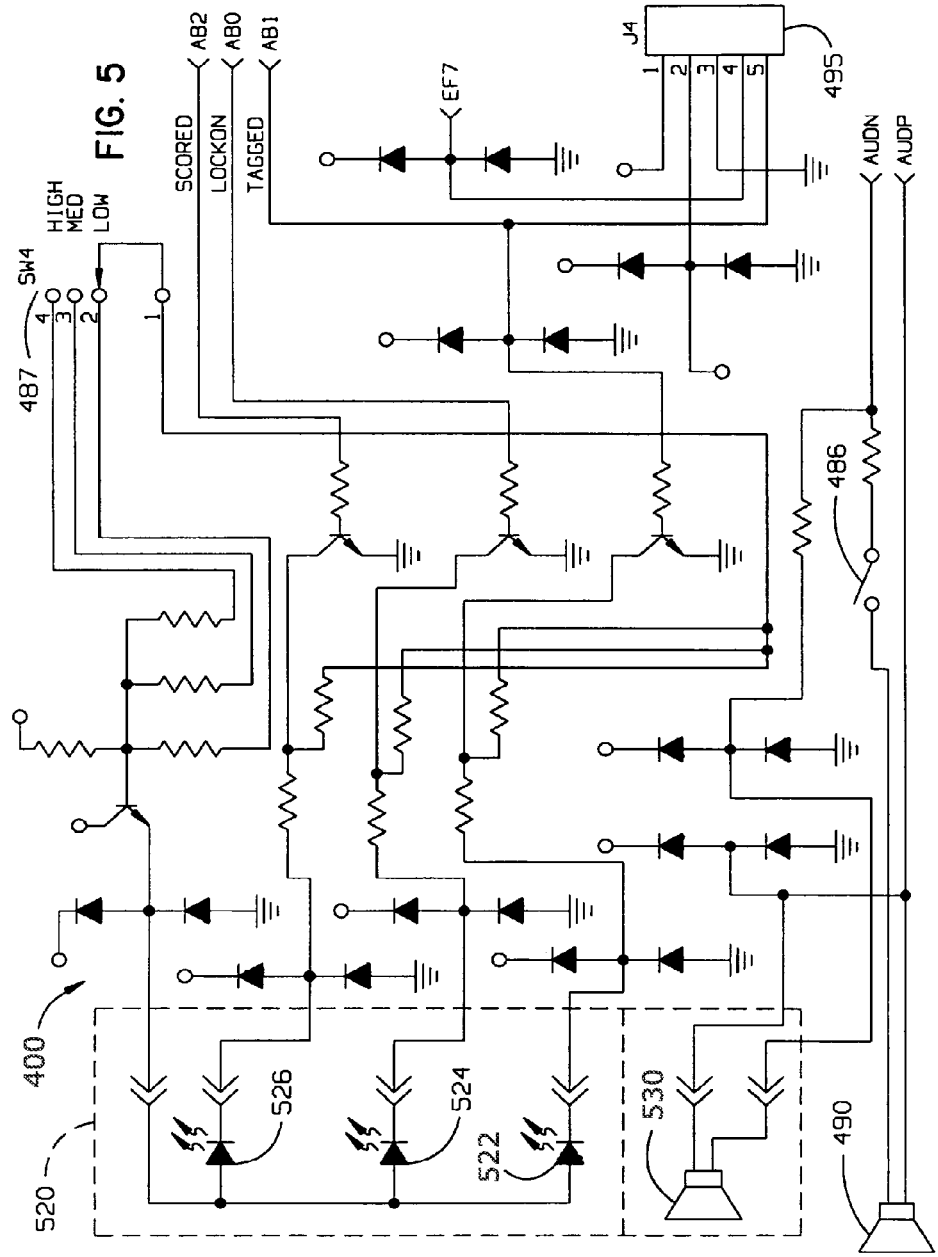

Referring now to FIGS. 4A, 4B and 5 an exemplary electrical system 400 is shown in accordance with the foregoing described exemplary playset including the device 10 and HMD 80. As shown in FIGS. 4A-B, the electrical system 400 includes a controller 410. The controller 410 may be any type of logic device known in the art such as a micro-controller, microprocessor, digital signal processor (DSP), programmable logic controller (PLC) or the like, that is operable to receive one or more inputs and affect one or more outputs relative to the received inputs. As shown, the controller 410 may be a single chip microprocessor containing RAM, ROM, input/outputs (I/Os), and the like known in the art. One exemplary controller 410 is the GPL61A available from the GeneralPlus Technology Company, Inc. The GPL61A is an 8-bit CMOS single chip microprocessor including: SRAM; ROM; I/Os; 2-channel PWM audio output for direct driving of a speaker; and a display driver for controlling a liquid crystal display (LCD). The controller 410 is powered by a power supply, which may include one or more power sources (e.g., batteries).

As shown in the illustrated embodiment of FIGS. 4A, 4B and 5, the power supply includes two power sources 412 and 414 for energizing the various circuits and subsystems. In one exemplary embodiment each power source 412, 414 includes three AA-sized batteries to provide 4.5V and 9.0V total to the system 400. The system 400 may include fuses to protect the controller 410 and other system electronic components from power surges from sources 412, 414, due to faults or the like. As is known, the sources 412, 414 are disposed within the housing of a portion of the playset (e.g., within the body or grip portion of the gun), but the sources 412, 414 may be located externally, for example in an external battery pack that may be worn on the body or carried by the user. As shown, the sources 412, 414 cooperate with controller 410 and a switched power supply 416 to provide a switched voltage Vsw for energizing one or more of the foregoing subsystems, particularly receivers 430, 450 as shown in FIG. 4B. Further, as shown, the system 400 includes crystal oscillator 418 and resistor oscillator 419, crystal oscillator 418 having a frequency of 32768 Hz for clock-type timing and resistor oscillator 419 generating 8 MHz master oscillation frequency within the processor 410. Although the oscillator 418 is external to and coupled with the controller 410 the oscillator may alternatively be integral with the controller 410.

As known in the art, the controller 410 operates under control of the software code, which may reside in the controller memory (e.g., ROM, RAM), to provide programmable and interactive device functionality and defined gameplay for two or more playsets that is described hereafter in further detail. To this end, the controller 410 receives user signals relative to user inputs from keypad 470 and buttons/switches 471-476 and 481-484 as well as remote signals received from other players/playsets via receivers 430 and 450. In response to receiving the user and remote signals the controller 410 outputs information to the user via display 460, speaker 490, HMD 520-530 and to other players/playsets via transmitters 420, 440. As shown, the system 400 includes a first transmitter 420 linked with the controller 410 and a first receiver 430 linked with the controller 410. The first transmitter 420 may be an infrared (IR) emitting diode or the like known in the art for outputting an IR or near-IR signal, and the first receiver 430 may be an infrared (IR) receiver or the like known in the art for sensing/detecting an IR or near-IR signal. Referring back to FIGS. 1-2, the first transmitter and receiver 420, 430 are disposed within respective tubes of the double-barrel portion of the gun-shaped housing to provide long-range, duplex (i.e., two-way) directional communications with another player, particularly a remote player up to several hundred feet away from the first transceiver, having a substantially similar playset.

Figure 6:
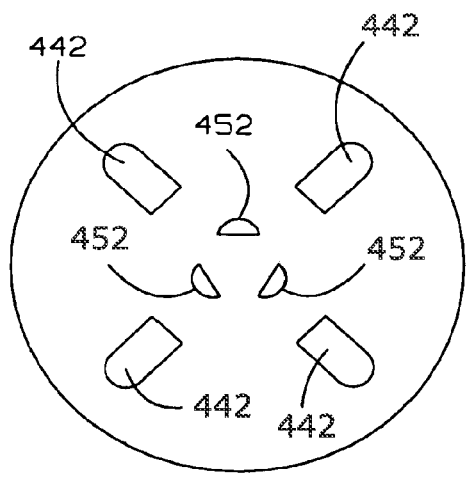
FIG. 6 is a plan view of an exemplary omnidirectional transceiver of the device of FIGS. 1-2.
Figure 7:
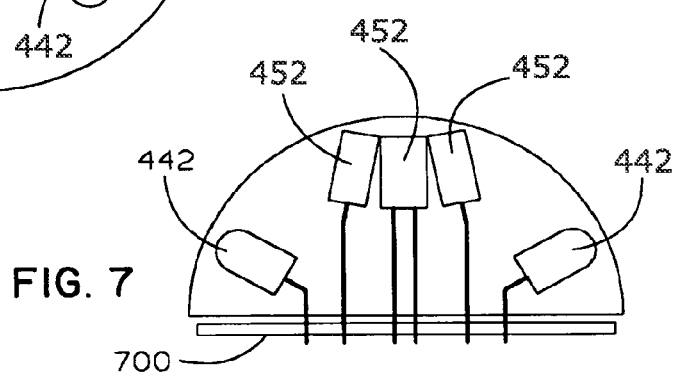
FIG. 7 is an elevation view of the exemplary omnidirectional transceiver of FIG. 6.

Similarly, the system 400 includes a second transmitter 440 linked to the controller 410 and a second receiver 450 linked with the controller 410. As shown, the second transmitter 440 includes four infrared emitting diodes (IRLEDs) 442 or the like known in the art for outputting an IR or near-IR signal, but fewer or additional IRLEDs may be provided. Referring now to FIGS. 6-7, the IRLEDs 442, of the second transmitter 440 are shown disposed within the hemispherical dome illustrated in FIGS. 1-2. As shown in FIG. 6, the four IRLEDs 442 are arcuately oriented and spaced apart equally by approximately ninety degrees with respect to the center of the dome's base. Additionally as shown in FIG. 7, the IRLEDs 442 are inclined by about fifteen degrees above the base of the dome to provide an omnidirectional IR short range signal. An exemplary IRLED for this arrangement would be a diode with a +/−forty five degree beam emission, but other IRLEDs and corresponding physical orientations thereof may be substituted as appropriate. As will be described hereafter in further detail, a primary function of the second transmitter 440 is to provide for constant transmission of a user identification signature or "beacon" so that players may identify each other as friend or foe (IFF) and target each other without the use of visual or audible cues such as recognizing a player's clothing, face or voice. The second transmitter 440 provides other functionality as well including facilitating communications with other proximate user's playsets.

The second receiver 450 includes three infrared (IR) photodiodes 452 or the like known in the art for detecting/sensing an IR or near-IR signal, but fewer or additional IR photodiodes may be provided. As shown in FIGS. 6-7, the IR photodiodes 452 of the second receiver 450 are illustrated as disposed within the hemispherical dome of FIGS. 1-2 along with the foregoing IRLEDs 442. The photodiodes 452 are shown to be inset and elevated with respect to the IRLEDs 442, but other suitable orientations of the IRLEDs 442 and photodiodes 452 are suitable so long as the IRLEDs 442 and photodiodes 452 do not interfere with each other and provide for omnidirectional transmission and reception of signals As shown, the three photodiodes 452 are arcuately oriented and spaced apart equally by approximately one hundred twenty degrees with respect to the center of the dome's base, and are inclined by about fifteen degrees (FIG. 7) with respect to the central axis of the dome's base. As mentioned, the second receiver 450 provides an omnidirectional IR sensor. An exemplary IR photodiode for this arrangement would be a photodiode with a +/−sixty degree beam detection width. As will be described hereafter in further detail, the second receiver 450 provides a constant receiver to primarily identify other proximate users having playsets and to receive long-range signals transmitted from the directional transmitter 420 of a remote user's playset.

The IRLEDs 442 and photodiodes 452 may be coupled to a circuit board 700 disposed within the base of the dome In one exemplary embodiment, the circuit board 700 is a printed circuit board (PCB) including the second receiver module 458 (FIGS. 4A-B).

As previously mentioned, the playset provides a programmable and interactive user interface. To this end, the system 400 includes a user interface having a display 460 linked to the controller 410 and a keypad 470 linked to the controller 410 for providing human input thereto. As shown in FIGS. 4A-B, the display 460 is a liquid crystal display (LCD) panel that is known in the art, though other types of displays could easily be used. The display 460 may provide one or more of an alphanumeric display and one or more indicia or icons which may relate to the communication between users' playsets and the gameplay. The keypad 470 includes a plurality of buttons 471-476. The keypad 470 and display 460 are located proximate each other on the housing and facing the user when pointing the barrel portion outward. Each of the buttons 471-476 are user-operable contact switches linked to the controller 410 for entering information into the playset by scrolling through and selecting options via a pre-programmed menu structure, which resides in the controller memory and is displayable on the display 460.

Each of buttons 471-476 may have one or more functions including a main function and a second function. Second function button 471 enables the second function of buttons 472-476 by holding the second function button 471 while pressing one of the buttons 472-476. By pressing the display button 472 for example, the user may select the type of information displayed on display 460 before, during or after a game. By pressing second function button 471 and display button 472 for example, the user may adjust the contrast of the display 460. The user interface including display 460 and keypad 470 permits a user to configure or otherwise program the functionality of the playset and the gameplay relative to two or more playsets (including rules, teams and other game characteristics discussed hereafter).

As shown in FIGS. 4A, 4B and 5 the system 400 includes a plurality of buttons and switches linked to the controller 410 for operating the playset and for customizing the operation of the playset relative to the user. Herein the user interface includes selection screens to adjust one or more gameplay parameters selected from the group consisting of game type, game time, number of tags to transmit, number of tags received until out tagged out, number of shields or shielded time and number of teams. To this end, the system includes buttons 481-484 for operating the playset and switches 485-487 for adapting the playset to the preferences of the user. Trigger button 481 is associated with a first finger-actuated, movable trigger on the gun housing for transmitting a long-range communication (or "tag" as known in the art) to another player via directional transmitter 420. Shield button 482 is associated with a second finger-actuated, movable trigger on the gun housing for temporarily disabling the transmitters 420, 440 and receivers 430, 450 such that the playset is rendered temporarily out of communications with the other units in the game. When the shield button 482 is pressed the playset will not transmit its identifying (i.e., beacon) signal or any tags and also will not receive identifying beacons or tags from other participants' playsets for a predetermined amount of time. The pump/reload button 483 is associated with the reload lever forward of the first and second triggers and is actuatable by the user to reload the playset with a predetermined quantity of transmittable tags. The function button 484 enables additional functionality for the foregoing trigger buttons 481, 482. For example, the user may enable a "mega tag" feature, which is a multiple tag transmit signal that may be used to quickly tag out another game participant from the game, by pressing and holding the function button 484 while repeatedly pressing the trigger button 481. In a team game the user may enable a "medic mode", which is used to give assistance to or receive assistance from other players on the same team, by pressing and holding the function button 484 while pressing the shield button 482. Medic mode can be used to assist a player who is in danger of being tagged out, or to build-up one of the team's players.

The playset may be used indoors or outdoors, and to this end the system 400 provides a user-selectable switch 485 to increase or decrease the transmit signal (i.e., tag) strength of the directional transmitter 420 and omni directional transmitter 440. When using the playset indoors, the switch 485 should be in the open state so that directional transmit signals do not reflect and/or scatter thereby accidentally tagging other game participants such as team members. When using the playset outdoors, the switch 485 should be in the closed state so that the directional transmit signals may overcome any ambient IR sources. As shown in FIG. 5, the system may include a speaker 490, which may be internal to the housing for providing sound effects and/or simulated speech. The controller 410 may include a memory of one or more pre-recorded sounds and/or synthesized voice, and the controller 410 may be operative to drive a speaker directly or via an audio amplifier for speech or melody synthesis. The controller 410 includes eight-bit resolution, two-channel pulse width modulation (PWM) outputs to drive the speaker 490. A speaker switch 486 may be opened or closed as desired by the user to respectively disable or enable the speaker 490.

As mentioned previously, the playset may include a user-worn interface such as a head-mounted display (HMD) or heads-up display (HUD) adapted to be worn on the user's head for providing the user with a graphical or iconic interface proximate the user's eye, and facilitating gameplay. As known in the art, the HMD may be removably coupled to the gun by way of a cabled connector. Moreover, the gun may include other connectors or ports for coupling other removable or interchangeable devices/accessories to the gun, such as connector 495 shown in FIG. 5. In the illustrated embodiment, the user-worn interface system 520 is coupled to the gun electrical system 400 and includes an iconic interface having three light emitting diodes (LEDs) 522, 524, 526. As will be described hereafter in further detail, the interface 520 is made of a generally transparent or translucent see-through material and disposed proximate the user's eye so that the user's field of vision is not affected. As such, the user is able to see the real world while simultaneously viewing by reflection the LEDs 522, 524, 526 which provide status information to the player. The LEDs 522-526 may illuminate indicia or icons that correspond to one or more icons displayed on the display 460 so that the user need not maintain intermittent or constant visual contact with the gun. Thus, in one exemplary use, the user may move the gun to direct the directional receiver 430 in a side-to-side sweeping motion to quickly identify opponents and teammates with the user-worn iconic display 520. Further, the iconic display 520 enables the user to target and tag other participants that may be outside of the user's line of sight, such as around a corner or other obstruction. As such, the player can get visual feedback that his gun is properly aimed without having to look through a typical mechanical aiming sight mounted on the gun. As shown, the system 400 provides a user-selectable multi-position switch 487 for increasing and decreasing the light output of the LEDs 522-526 that is, ultimately, visible to the user's eye. In addition, the user-worn interface may include a speaker 530 that furthers the iconic interface by providing the user with auditory indicia or signals corresponding to the one or more visible indicia or icons. In this manner, the HMD operates to output visual and audible cues to the user relative to the user's surroundings and game play. In an exemplary embodiment, the red, green and yellow LEDs 522, 524, 526 are associated with icons indicating respectively that the user has been tagged by another player, that the user is targeting another player and that the user has tagged another player. Further, the speaker 530 may output audible cues facilitating IFF (e.g., a friend sound and a foe sound) when the green LED 524 is illuminated.

Figure 8:
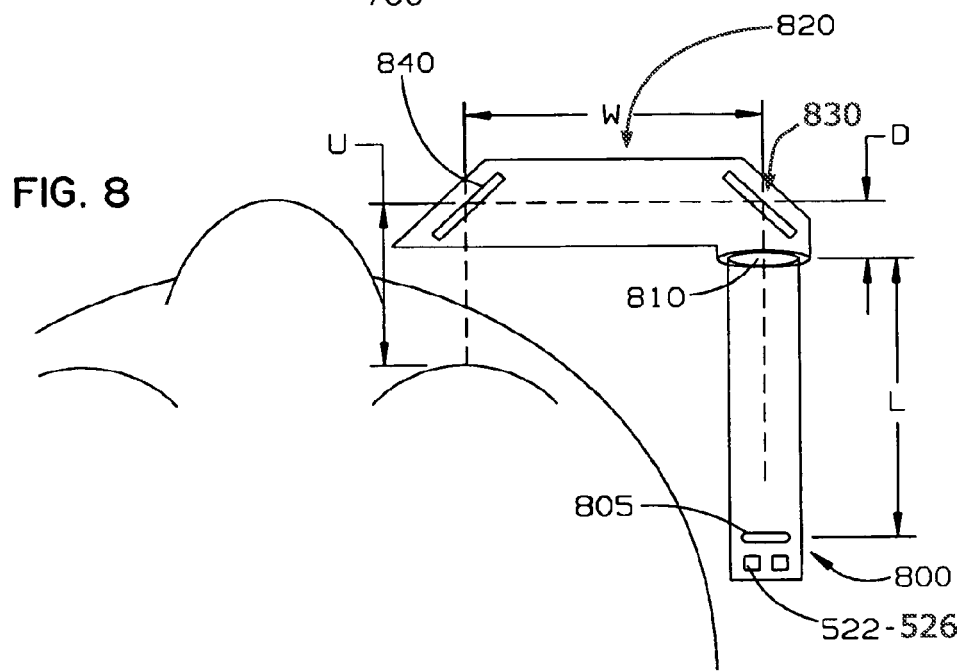
FIG. 8 is an exemplary optical schematic diagram in accordance with the display device of FIG. 3.

Referring now to FIG. 8, an optical schematic diagram illustrates operation of the HMD. As shown, the HMD is a folded-path optical system employing a first surface mirror and a partial mirror combiner. A backlit film is viewed through a head-mounted optical system including a fold mirror and a combiner (i.e., a partial mirror) in order to wrap the optical system around the side of the user's head. The HMD includes an optical projector 800 oriented along the side of the user's head and a see-through frame 820 coupled to the projector 800 and disposed in front of at least one of the user's eyes. The optical projector 800 includes a first end with the LEDs 522-526 and icon film 805, and a second end with a lens 810. The lens 810 is spaced apart from the film 805 by a distance L, which in an exemplary embodiment is approximately 73 mm, to magnify the illuminated icons on film 805 and transmit the icons to the frame 820. The first end of the frame 820 (proximate the lens 810) includes a first surface mirror 830 that is separated from the lens 810 by a distance D, which in an exemplary embodiment is approximately 13 mm. The first surface mirror 830 is oriented at an approximate forty five degree angle with respect the lens axis to reflect the illuminated icons along the width W of the frame 820 to the second end including combiner 840 that is spaced from the user's eye by a distance U. In an exemplary embodiment, the width W is approximately 60 mm and the combiner 840 is distanced from the user's eye by approximately 40 mm. The combiner 840 may be a partial mirror surface known in the art to allow the user a generally unobstructed view through the illustrated icons. In one exemplary embodiment, the displayed information comprising targeting of others, tags on the user by others and tags given to others, moves with the player's head as the HMD combiner 840 is mounted to stylized glasses. As such, the HMD and gun combination allows the user to enjoy game play information in his or her field of view while playing the game.

As is generally well known in the art, toy infrared gun and target systems work by transmitting a coded signal from the transmitter (gun) to the infrared receiver (target). This transmitted information is typically used to send a tag or hit signal to the receiver. If the target receives the appropriate coded infrared signal, a tag is registered. Transmitters will normally focus infrared light into a narrow collimated beam using a lens in front of an infrared light emitting diode (IRLED). Receivers typically use a photodiode or photo detector to receive the coded infrared signal, however, receivers typically do not use any lens in front of the receiving device in order to have a very wide viewing angle. In such well-known infrared gun and target systems, only a one way path exists with the transmitter (gun) sending information to the target (receiver) in what is commonly called "forward IR" communication. It is difficult for the user of the transmitting unit to know that he has accurately landed a tag on the targeted unit if the two are separated by any appreciable distance since neither sound nor light carry well in typical outdoor play environments.

Alternatively known in the art are systems intended for use indoors which make use of a "reverse IR" approach in which each unit continuously transmits a unique omnidirectional identifying signal. The identifying signals from a first unit are then detected by the narrow-angle directional receivers of any second unit which is properly aimed at the first unit. If the user of such a second unit activates their trigger input while said second unit is receiving said identifying signal, the second unit judges itself to have scored a tag on the first unit. However, the first unit cannot know that it has been tagged unless there exists also a game controlling computer which is alerted to the successful tag by the second unit and which then advises the first unit that it has been tagged. Such communication normally is performed using radio-frequency (RF) transceivers.

As just described, indoor systems for infrared shooting games typically known in the prior art employ a separate game control computer linked to all playing devices via wireless RF link. This computer and RF link provide game configuration, real-time scoring, and essentially immediate feedback to each player related to game events such as tagging another player or being tagged by another player. While well suited to indoor arenas, this approach is not well suited to outdoor play in a consumer environment. The added cost of the computer and wireless RF link, the difficulty of setting up the system, the extended ranges (often hundreds to thousands of feet) over which the RF link must function, and the difficulty of meeting these requirements while simultaneously meeting government regulations for RF broadcast systems, makes such an approach too complex and expensive for the home system.

Past home systems have provided the flexibility of variable game configurations by having a first player input a specialized code via a sequence of button presses so as to configure their device for the desired game. These systems have further provided for a method whereby such configuration may then be transmitted over the directional infrared beam of the first player's device to the receivers of the devices of other players in the game. This system however has drawbacks as there is no reliable manner for the transmitting device to know that the receiving device has correctly received the information, and there is therefore also no reliable way to assign unique player ID numbers to each player's device so that the performance of players and teams may be scored. In addition, the ability to define the game is dependant on the ability of the user to memorize a large number of specialized code sequences which must be properly entered into the first player's device without error.

Other home systems allow for configuration of the game on a separate "base unit" with a more user-friendly input and display system. This base unit device then communicates the game definition data to removable "program modules" which are then connected to player units where they in turn control the game definition for each player unit, collect game performance data during the game, and report said game performance data to the base unit at the end of the game for analysis. However, this system relies on the use of both a separate base unit and a plurality of said removable program modules for the transport of the game definition and the game performance data. This is undesirable from the consumer's point of view as it requires the use of a base unit which serves no actual function during the game proper, and it also relies on the secondary purchase of a multiplicity of program modules for each player in the game, and these program modules due to their removable nature are easily lost.

Therefore, it is a desirable goal to provide for a system in which no non-playing devices of any kind are needed to perform game definition or to store, report, or analyze the game performance data. It is further desirable to provide a method by which such game definition and performance analysis may be carried out in a simple and intuitive manner which players of all levels of familiarity with the equipment may be able to enjoy. Further, it is desirable that such additional hardware as would be needed for each player's device to support these features should be minor so as to minimize cost, and that this additional hardware should also provide functions which inherently add variety and interest to the game even if the more advanced functions of game definition and performance analysis are not being utilized by the players. To this end, the present embodiment discloses an apparatus and a method by which all of these goals may be met.

In view of the foregoing description of the gun electronics, the subject toy gun system has multiple communication paths wherein the gun and the target both operate to transmit and receive coded information before (e.g., game setup/joining), during, and after (e.g., gameplay analysis, player/team ranking) the game. By doing so the ideal system is realized in which fully controlled and scored games may be played over considerable outdoor distances while providing immediate feedback for tags successfully landed on opponents and providing the ability to record and rank player and team performances without the requirement for additional potentially expensive computer systems which are not part of the guns or targets themselves.

Assuming that there are two guns, (e.g., gun A and B) the communication paths for tags are as follows: the directional transmitter 420 of gun A transmits coded information that is received by omnidirectional receiver 450 of gun B. In order for gun B to receive the coded information from gun A, the barrel portion of gun A must be optically aligned with the omnidirectional receiver 450 of gun B. In a near-instant acknowledgment of receiving the coded information from gun A, the omnidirectional transmitter 440 of gun B outputs coded information acknowledging a hit, and this information is received by the directional receiver 430 of gun A since the barrel portion of gun A has not moved substantially in the instant between gun B receiving the coded information from gun A and outputting the acknowledgement. As such, two way communication may be achieved between two or more guns. Since the transmit and receive functions of the omnidirectional transmitters are substantially 360 degrees about the users, the orientation or attitude of gun B is inconsequential to achieve communications. This two way optical path can be used for any closed loop communications.

Two or more guns may also communicate directly through the omnidirectional transmitters and omnidirectional receivers, but the communication range is on the order of approximately 25 feet. The advantage of communication through the omnidirectional transmitters and receivers is that there is no need to optically align the guns. Thus, proximity warnings and gameplay features may be enabled as described hereafter.

The gun software uses four infra-red communications channels (two directional and two omnidirectional) to create a multinode network, such that each gun unit (and user) may be identified uniquely, assigned to a team as appropriate, and communicate with other users/game participants in the network as needed. The network of intermittently communicating gun units forms a game. Unit-to-unit communications may be performed either specifically or generically. In a specific communication, the transmitting unit addresses a specific other unit in the game so that any units receiving the transmission other than the intended receiver will know that they should ignore the communication. In a generic communication, the transmitting unit broadcasts information, and such information is accepted and processed by all other units that receive the broadcast data. Such communication options enable two or more gun unit users to enjoy gameplay and device features significantly advanced beyond the traditional game of laser tag. For example, the subject system allows a host gun unit to wirelessly program, through IR transmission, one or more other gun units with the same game definition entered into the first (or "host") unit by one player. Thus, the host operates to facilitate team games and other advanced and customizable gameplays.

To this end, the host user selects the type of game to play and adjusts the game characteristics using an interactive menu-driven interface. This provides a much more intuitive method to select a game and adjust the game particulars than the cumbersome and complex method of combinations of key press codes or the expensive use of additional game-programming computers as generally known in the art. The host unit is programmed with the game definition by one user, and then the host unit automatically broadcasts/transmits the game definition to all other units wishing to join the game. This joining process eliminates or substantially reduces errors and misunderstandings that might otherwise lead to different players not playing the same type of game. It also simplifies the method of joining a game, so that less experienced players can still participate in complex games without having to go through a complex process of learning how to play/participate.

A multi-player game may begin with an optional "host/join" process, wherein one unit that is designated as the host is programmed with the game definition by one user. Subsequently, the host identifies itself and broadcasts the parameters of the game (e.g., gameplay, rules, etc.) that is about to be played to all other units in an area proximate the host. These other units, known hereafter as the joiners, receive the game definition and may elect to participate by communicating with the host. Each joiner receives the game definition and a unique identification (ID) code. Further, if the game is played in groups of two or more teams the host associates each of the joiner's ID codes with a team ID code, which will later facilitate team ranking and other gameplay analysis. The foregoing pre-game host/joiner communication are performed via the omnidirectional transceivers of the gun units.

After all units that will participate in the game have been joined by the host, the game may start after a delay during which the users take up their initial positions for the game. This initial game delay is identified by a count-down to zero (called the "t-minus countdown"). If the host/join process was used, this countdown is broadcast by the host to all of the joiners so as to synchronize the starting time of the game for all participants. In this manner, all participants in the game will start and end their games together. Further, the host may broadcast information identifying the IDs for all valid units in the game to allow all units to more easily reject spurious communications (e.g., tags received from non joining units or units joined to another adjacent game). Once the t-minus countdown is completed the active phase of the game begins.

During the active phase of the game, the omnidirectional transmitter is used primarily to send "Beacon Signatures" identifying team affiliation of the transmitting unit. As previously mentioned, such a broadcast beacon signature signal allows the other units in the game to "lock-on" to or otherwise target and identify the transmitting unit as friend, foe or neutral (IFF) and to be alerted if an opposing unit is in close proximity but has not been targeted. Further, the omnidirectional transmitter operates to transmit an acknowledgment signal confirming the receipt of any tags by the unit's omnidirectional receiver. As a secondary function, this omnidirectional infrared channel may be used to transfer data between players in a game (e.g., medic-mode transfers) or to identify active-area units (e.g., bases, zones, etc. which perform special functions when in close proximity to players) to the other units in the game.

During the active phase of the game, the directional transmitter is used primarily to send "tag signatures" or tags in response to the user's trigger actuation. As is known, players attempt to "land" these tags on the other players in order to score points, tag-out opponents and win the game. However, this channel may also be used to send directed or specific communications for the purposes of text messaging, programming accessories, etc.

Throughout the game each unit records all meaningful occurrences of the various signatures being transmitted, received, time elapsed before the player is tagged-out, and such other interactions as may be relevant to the final analysis of each unit's gameplay for the purposes of scoring of the game and generating player/team ranking among other things. Once the game has ended either by timing out of the game duration or alternatively if the host manually ends the game, if the host/join process was used to start the game then the host will begin a "debriefing" process whereby it interrogates each individual unit that was joined into the game. Each such joined unit, upon interrogation by the host, reports its collected game data back to the host. Once the host has aggregated all of the available game data, it combines and analyzes the data in order to rank each of the individual players and teams within the game. The host then transmits the rankings back to the joiners for their review. In addition, players can individually call up head-to-head scoring information to determine how they did specifically against each of the other players in the game. If one or more of the joiners does not respond to the host's interrogation, such as, for example, if a joiner had to leave the game before the end for some reason or if the joiner malfunctioned, the host operates to discard or otherwise reconcile any data received from the responsive joiners relative to the non-responsive joiners.

Data exchanged over the various communications channels can be categorized as four basic types: (1) beacon signatures, (2) area signatures, (3) tag signatures and (4) packet data. The device will transmit and receive a series of encoded infrared light signals which form a predetermined signature including an active synchronization pulse of duration X or 2X and a plurality of active data bit pulses, each separated from one another by an inactive pause of duration Y. The data bit pulses represent values of "0" or "1" by having an active period respectively of less than or more than one-half X as determined by the duration of the synchronization pulse. The last inactive pause which follows a series of the active data pulses and identifies the end of the signature will have a duration of greater than 2Y. The active synchronization pulse of duration X or 2X is either 3 ms+/−10% or 6 ms+/−10% respectively and the inactive pause of duration Y is 2 ms+/−10%. The series of active data pulses numbers no less than 5 and no greater than 9 active data pulses. The signature is preceded by a pre-synchronization pulse with an active period of 3 ms+/−10% followed by pause of 6 ms+/10%. The function of this pulse is to allow the receiver to automatically adjust its gain levels to best receive the incoming signal with minimum distortion. The beacon signatures include a 6 ms+/−10% synchronization pulse (2X), and the tag signatures and packet data signatures include a 3 ms+/−10% synchronization pulse (X). To accommodate those receivers which must have a certain period of no detectable signal in order to maintain proper gain levels, the software controlling the transmitters typically enforces on itself a "Special Format Pause" of at least 18 ms+/−10% after the end of each signature before it will begin the next signature.

Beacon signatures are broadcast regularly and automatically during the game by each unit for identifying information about the status of the sending unit (i.e. team affiliation, whether or not the sender has just been tagged, and if tagged with how many hit points). When the beacon signature is received by the directional receiver of another unit, the beacon signature may facilitate a targeting or "locked-on" condition or "hit confirmed" condition in the receiving unit. When received by the omnidirectional receiver of another unit, the beacon signature may facilitate a "proximity warning" condition in the receiving unit.

Area signatures are a modified form of the beacon signatures. Area signatures are always broadcast on the omnidirectional transmit channel, and are used to identify a physical area of special significance within a game, for example, a base, an area being contested, a neutral "safety" area, or such other area as may be defined in the game. When an area signature is received by the directional receiver of another unit, the area signature may facilitate a targeting or "locked-on" condition in the receiving unit (if the area signature signifies a base associated with a team in a game), or may simply be ignored. When received by the omnidirectional receiver of another unit, the area signature facilitates a "special zone" condition in the receiving unit. The software of the receiving unit then uses this special zone condition to enable special processing functions associated with the specific area, such as, for example, recording the cumulative time spent in the area, re-enabling a disabled unit, etc.

Tag signatures are typically transmitted on the directional transmit channel and identify the ID of the sending unit and may also include additional information. For example, a unit may transmit a "mega tag" such that the tag signature includes information that identifies "extra tag points" the user has added to this signature to cause any receiving unit to act as if multiple copies of the single tag signature had been received in rapid succession. When the tag signature is received on the directional receive channel of another unit, these signatures are generally ignored. When the tag signature is received on the omnidirectional channel of another unit, the tag signatures result in the receiving unit processing the signature as one or more "tags" or hits being received from the sending unit, which is recorded for analysis by the host.

Packet data signatures are typically transmitted and received on the omnidirectional infrared channels, and are used to transfer more extensive information than can be represented using the foregoing signatures. Such packet data can be game definitions, player-to-player communications such as medic assistance, text messages, game performance statistics, or other communications. Packet data signatures may be transmitted and received using any combination of the directional and omni directional transceivers. For instance Text Messaging is transmitted from the directional transmitter of the initiating unit and received on the omni directional receiver of the receiving unit while medic assistance communications are transmitted by the omni-directional transmitters and received by the omni-directional receivers.

Exemplary Communications Details

Figure 9A:
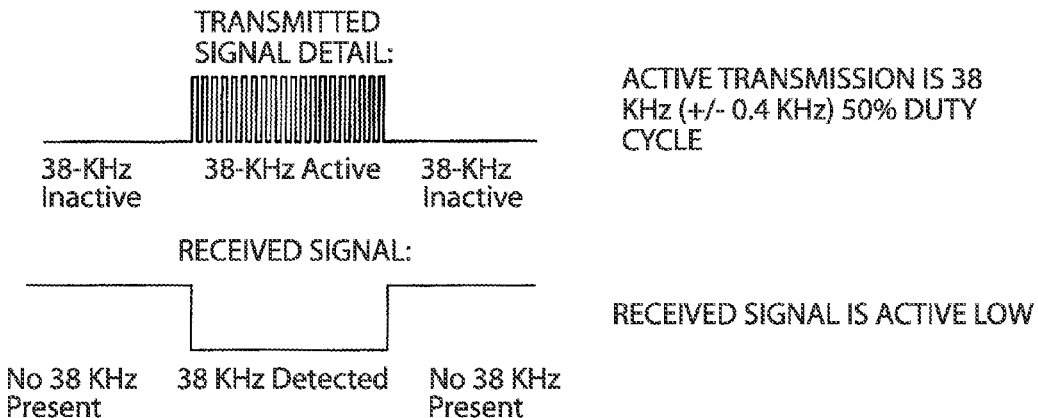
FIGS. 9a-9g illustrate exemplary infrared signal waveforms facilitating infrared shooting game communications between two or more game devices.

All infrared communications consist of an approximately 38 KHz-40 KHz carrier frequency (hereafter called "38 KHz") modulated on or off by the data to be transmitted, the resulting signal driving an infrared light emitting diode (IRLED) creating a signal of modulated 38 KHz IR, which when detected by the receivers results in an active-low signal as shown in FIG. 9a. Periods of active 38 KHz modulated IR generation are called "bursts" while the resulting active-low outputs of the receivers are referred to as "pulses." The periods when no 38 KHz modulated IR is present and the resulting output of the receiver is high are both called "pauses".

Because the integrated circuit receivers used to detect the IR signals may have a problem initially identifying a signal and isolating it from any background or ambient level of IR energy, each signature is preceded by a "Pre-Sync" burst of modulated energy followed by a "Pre-Sync Pause" to allow the receiver to set its gain levels to match the signal that follows. This forms a "throw-away" pulse at the start of each signature which will not affect anything if its duration is distorted as the receiver circuitry tries to properly acquire the incoming signal.

Because the controllers of different units can typically be expected to be running at different speeds from one another, particularly if a low-cost resistor oscillator or R/C oscillator is used for timing, the Pre-Sync Pause is then followed by a Sync pulse of a known duration as perceived by the transmitting unit. This allows the receiving unit to identify what speed the transmitting unit's controller is running at relative to the receiver's controller speed so that variations in timing can be properly accounted for. The Pre-Sync and Pre-Sync Pause help to ensure that the duration of this pulse is exactly as intended by the transmitting unit.

Figure 9B:

As a result of the foregoing, all signatures consist of a Pre-Sync (PS), a Pre-Sync Pause (PSP), Sync, and a plurality of data bits, as shown in FIG. 9b. As shown, a "Special Format Pause" (SFP) is added at the end of each signature, to accommodate those receivers which require that the modulated IR signal be entirely gone for a period of time (typically 20 msec out of every 100 msec) in order to allow the receiver to identify background levels of 38-khz noise and reject it.

Figure 9C:
Figure 9C:
Figure 9D:
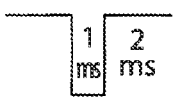
Figure 9D:
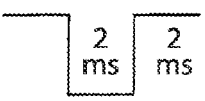

During a game, all units attempt to cooperate such that data "collisions" will be kept to a minimum. However, it is a fairly common occurrence for the signatures from two or more different units to arrive simultaneously at the omnidirectional receiver of a third unit, causing a corrupted signature to be received by that third unit. During normal game play, such corruption is most frequently seen as the beacon signatures from the other units colliding at the receiver of the third unit, resulting in a signature which looks very much like a valid tag signature. To prevent the receiving unit from interpreting such a corrupted signature as a spurious tag signature, all beacon signatures (including area signatures) use a longer Sync Burst than do the tag or packet data signatures as shown in FIG. 9c. In this way, the receiving unit can know that the signature it began receiving was a beacon or area signature. Thus, if the received signal appears to be a tag signature (FIG. 9c) but has a 6 msec Sync Pulse, the receiving unit may discriminate the received signal as corrupted data. As shown in FIG. 9d, aside from the PS and Sync bursts, all data bits are either a "0" (e.g., a short burst with a duration of 1 msec) or a "1" (e.g., a long burst with a duration of 2 msec). All data bits are followed by a 2-msec pause to separate bits from one another.

Figure 9E:
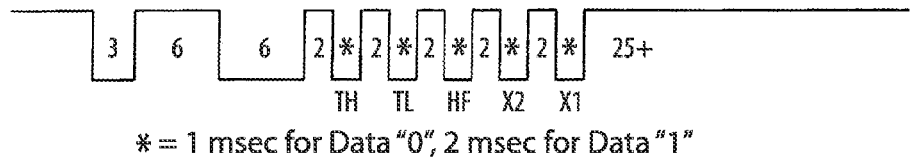

As shown in FIG. 9e, beacon signatures include the PS and Sync pulses followed by five bits of information about the sending unit. The five bits are as follows:

TH and TL bits identify the team affiliation (if any) of the transmitting unit. These bits do not necessarily represent a "team" in the normal sense of the word (although they can) and may facilitate a means for the system to keep track of more than a predetermined number (e.g., 8) players in a game.

HF is a Hit Flag which, when set, indicates that this signature was generated in response to the transmitting unit taking one or more tags—if not set, it was sent automatically based on the internal timer of the transmitting unit ordering regularly-timed beacons.

X2 and X1 bits are Extended information, and are used to represent how many extra tag points were in the tag just received (if HF is 0, these will both be 0 as well).

Area signatures are special cases of the beacon signature in which HF is 0 but X2 and X1 contain at least one "1" bit. These combinations would make no sense as a beacon signature from a player unit, and are thus reserved for the various different area signatures. The area signatures are defined in Table 1.

TABLE 1

| X2 | X1 | Area signature definition |
|---|---|---|
| 0 | 1 | (reserved for future use) |
| 1 | 0 | area being contested in game |
| 1 | 1 | team base (base may be designated as a neutral territory) |

Figure 9F:
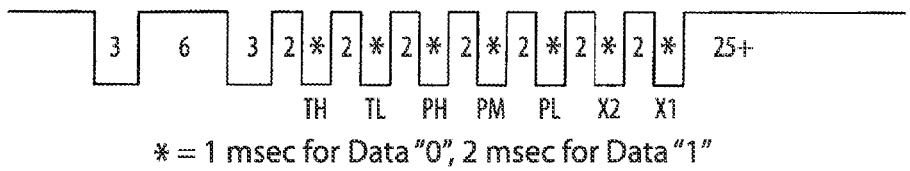

As shown in FIG. 9f, tag signatures include the Pre-Sync, Pre-Sync Pause, Sync, and 7 data bits. Tag signatures contain the unique ID of the transmitting unit, and extended data indicating the number of extra tag points (if any) added by the user to this tag (e.g., mega tag). For extended data definitions, see Table 2. Bits TH, TL, PH, PM, and PL form the unique ID assigned to each playing unit in a game. Alternatively, for games that were not hosted/joined, such as traditional laser tag, all players may share a single ID which is for example all 0s in these bits. As shown, this data essentially represents a two-bit team identifier and a 3-bit Player identifier, but as mentioned previously the "team" should not be construed to be necessarily a team in the normal sense of the word and it may facilitate a means for the software to keep track of more than a predetermined number of players in one game.

TABLE 2

| X2 | X1 | extended data definition |
|---|---|---|
| 0 | 0 | no mega, counts as 1 tag |
| 0 | 1 | 1 mega, counts as 2 tags |
| 1 | 0 | 2 megas, counts as 3 tags |
| 1 | 1 | 3 megas, counts as 4 tags |

Because each player in a hosted/joined game has a unique ID, all tags taken by every player in a game can be recorded by the unit receiving the tags for analysis, reporting and comparison after the game has ended. This allows each player to know not only how many times he or she was tagged by other players or tagged other players, but the player can also determine exactly who those other players were and how many times he or she tagged or was tagged by each of them.

The following packet data communications may be used for communicating more complex information than the specific information involved in the beacon, area, and tag signatures. Such complex data may be exchanged between two or more units at the beginning of a game to allow a host to automatically program joiners with the details of the game about to be played, to synchronize all players in a game and ensure that they all recognize or know the IDs that will and will not be valid during the game. During a game, such complex data may be exchanged between two or more units to allow players within the game to communicate and even transfer resources or liabilities to one another. After a game, such complex data may be exchanged between two or more units to allow performance data collection, ranking, and comparison of all units, among other things.

Figure 9G:
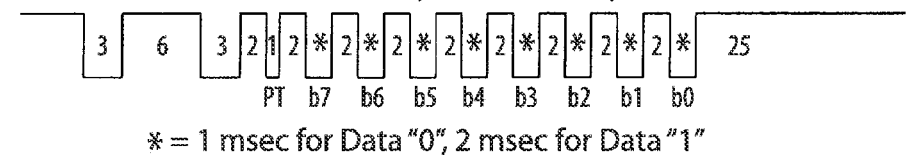
Figure 9G:
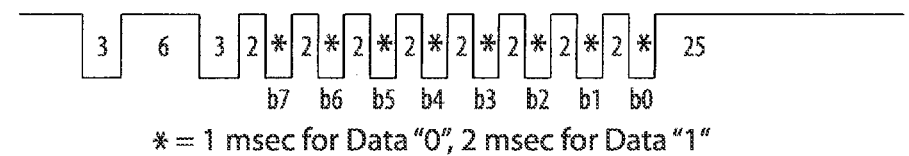
Figure 9G:
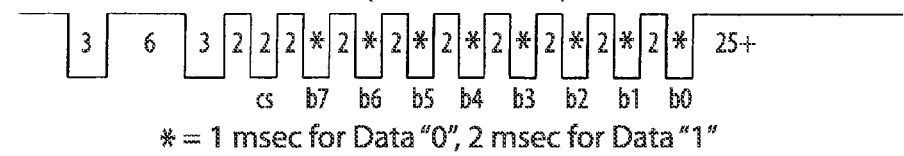

Packet data signatures can be any one of three basic types, depending on where they occur in the data stream. The first signature in the data stream (containing the first byte of information) is always a packet type byte, or "Ptype" as shown in FIG. 9g. There may or may not be one or more data bytes following the Ptype. All data streams are then terminated with a Checksum Byte, or "Csum." In addition to the expected Pre-Sync, Pre-Sync Pause, and Sync bytes, the packet data signatures will have either 8 (for data bytes) or 9 (for Ptypes and Csums) data bits. The first data bit in the Ptype and Csum signatures identifies which type of communication it is –0 for Ptype, or 1 for Csum. As shown, b7 . . . b0 are the data bits (b7=MSb, B0=LSb). The numeric values (b7 . . . b0) of the Ptype byte plus all subsequent data bytes are added in an 8-bit register as each byte is received, and this 8-bit value is compared against the value (b7 . . . b0) of the Csum byte when it is received. Any data stream which did not begin with a Ptype or did not end with the correct Csum will be rejected and thus ignored.

There is normally no specific data-length byte in the packets, as each Ptype tells the receiving unit what the meanings of the data bytes to follow are. Some packets are variable-length and thus do contain a data-length byte of one format or another, but this is not required in packets which are not variable-length. The maximum length of any packet is 22 bytes, including the Ptype and Csum.

Devices for infrared shooting games as are known in the prior art typically use a fixed number of data bits per signature, e.g. 8 bits. The limited number of possible combinations of "0" and "1" bits necessitates the sending of additional data in each signature to identify the type of data represented, for example a basic signature may consist of 8 data bits, but require a preamble of another 8 bits to indicate how this signature is to be interpreted, for example as a tag, as configuration information, as control information such as to disable a player, and so on. With the present described embodiment herein the user may configure various elements of the game by use of the keypad and an interactive text-based menu displayed on the LCD upon completion of game definition the electronic controller will operate via the second transmitter and second receiver to transfer the game definition and assign unique identities to one or more similar devices and cause other devices to begin the game in a coordinated manner. During the game the electronic controller acts to record for later analysis such events as are relevant according to the game definition, for example number of receipts of each valid tag signature or important active-area beacon signature. After the game the electronic controller acts to: interrogate by use of the second transmitter and second receiver each other similar unit which was given the game definition and assigned a unique identity before the game, receive from each such similar unit the relevant game events data recorded in that unit, aggregate this data and calculate performance rankings for the individual players and/or teams of players in the game, broadcast these rankings via the second transmitter to all of the similar units for review by the other human players, and display the relevant game events information and ranking data to the human user via the LCD display. Further, because interference from natural and man-made sources is typically present in the outdoor environment, infrared shooting game devices typically must either send redundant copies of each transmission or else must use lower data rates combined with hardware or software filtering of the received signals to ensure reliable reception of the data.

Because of the difficulty in maintaining line-of-sight infrared communications over time, it is desirable to transmit the required information in the shortest time possible for the required data. To this end, the system disclosed herein uses signatures of variable length so that no time is required for the sending of unnecessary data bits and yet no meaning is lost since the extra information is expressed by the count of bits in the signature. The receiving device may know what type of data was sent by counting the number of data bits received, and thus may know immediately whether the information was intended as a beacon, tag, data byte, or a marker for the start or end of a data packet, without the sending unit having to add additional bits to convey this information. By this means communications time is minimized, maximum reuse of available combinations of bits is achieved, and the ability to perform data type error checking is realized. For example, a value of hexadecimal 00 may represent any of several multiple meanings such as a beacon from a Team 0 player reporting no recent hits taken (5 data bits), a tag of 1 hit point fired by Player 0 on Team 0 (7 data bits), a value of 0 transferred between units as data within a communications packet (8 data bits), or the start of a communications packet which begins the countdown to game in the various participants (9 data bits).

Exemplary Game-Programming Communications

As previously mentioned, games are selected and defined through the use of a menu-driven process in which the user inputs data to the system software through the various input buttons, and the software displays prompts and selected values on the displays. In addition to pre-defined games which the user may not modify, the system also allows the user to select games which the user may then customize to his/her own liking. Once the game has been fully defined (either by default or by user modification), this definition is automatically passed from the host to all joiners in the area.

An example of the information transmitted from the Host to the Joiners in order to define the game is as follows:

| Order | Type of byte | Value | Meaning |
|---|---|---|---|
| 1 | Ptype | $0C | Special Game Definition |
| 2 | Data | $2C | Host's I.D. code (randomly chosen for each game) |
| 3 | Data | $15 | Game will last 15 minutes |
| 4 | Data | $50 | Each player is "out" after taking 50 tags |
| 5 | Data | $FF | Each player has an unlimited number of reloads |
| 6 | Data | $45 | Each player has 45 seconds of shields time |
| 7 | Data | $12 | Each player has 12 Megas |
| 8 | Data | $28 | Packed Flags Byte #1 = 00101000 |
| 9 | Data | $A2 | Packed Flags Byte #2 = 10100010 |
| 10 | Data | $32 | ASCII Character "2" |
| 11 | Data | $5A | ASCII Character "Z" |
| 12 | Data | $4F | ASCII Character "O" |
| 13 | Data | $4E | ASCII Character "N" |
| 14 | Csum | $E6 | (8-bit total of all preceding bytes) |

The foregoing packet defines a special game which will be hosted by a unit calling itself "2C". The game will last for 15 minutes, and in this game each player will have 50 tags until tagged out, unlimited reloads, 45 seconds of shield time, and 12 mega tags available. The game will be called 2ZON (short for "2 Zones"), and the details of how it will be played are defined by the two Packed Flags bytes that include:

```
$28:    00101000
        DX = 0:    Extended Tagging not required to disable players
        AL = 0:    Ammunition (Reloads) is not limited
        ML = 1:    Mega tags are limited
        FF = 0:    Friendly Fire does not affect teammates
        MM = 1:    Medic Mode is allowed
        TT = 0:    Rapid Tags are not ignored
        HH = 0:    Teams are not divided into Hunters and Hunteds
        SD = 0:    Hunters-Hunteds Starting Direction is irrelevant
$A2:    10100010
        ZG = 1:    There are Zones of contention in this game
        BT = 0:    Bases are not associated with teams
        TD = 1:    Tagged players are temporarily disabled
        BU = 0:    Base areas do not un-disable tagged players
        BH = 0:    Base areas are not Hospitals
        BF = 0:    Base areas do not Fire at players
        NT = 10:   Number of Teams in the game is 2
```

An example of data being transmitted during a text message sequence

| Order | Type of byte | Value | Meaning |
| --- | --- | --- | --- |
| 1 | Ptype | $80 | Text Message |
| 2 | Data | $48 | H |
| 3 | Data | $45 | E |
| 4 | Data | $4C | L |
| 5 | Data | $4C | L |
| 6 | Data | $4F | O |
| 14 | Csum | $F4 | (8-bit total of all preceding bytes) |

The forgoing packet defines a Text Message transmission during gameplay. The receiving unit will display "HELLO" in the alpha numeric LCD display of the receiving unit.

As can be appreciated, the software may allow for additional Packed Flag Bytes to be sent to tell joiner units how to process other situations beyond those already covered in the foregoing description and example. Units encountering situations for which no Packed Flag Bytes are sent will simply ignore the situation and not allow it to affect gameplay. If the game definition broadcast by the host involves dividing the various joining players into functional teams, the joining players may then select a preferred team to associate with. Alternatively, if the joiner has no team preference or the joiner's preferred team is full, the host may assign the joiner to a particular team. After any needed team preference has been supplied, the joiner unit automatically communicates with the host to receive an assigned player ID.

Once the host has determined that all units have been joined into the game (either because no new unit has requested an ID, because the host user has told the host unit that all other units have been joined or because there is no room left in the game for any more units to join), the host initiates a thirty second t-minus countdown and broadcasts the T-minus value along with a set of bytes identifying all units that were successfully joined to the game. When the joiner units receive this broadcast information they will then know when to start the actual game (based on the t-minus countdown value), which signatures are and are not valid in this game (based on the Packet Flag bytes and the list of valid IDs sent with the t-minus value) and how long to play the game (based on the information received in the game definition).

During the T-Minus countdown, an additional feature called "Cloning" may be allowed. In the Cloning process, two units being operated by a single player agree to share a single Player ID and some of the resources and liabilities assigned to the player by the Host. While the first of these two units, called the "Master," Joins or Hosts the game in the normal fashion, a second unit called the "Slave" listens for the game particulars as transmitted by the host but does not request nor receive a unique Player ID. Instead, once the T-Minus countdown has begun, it is "programmed" by the Master with the Player ID it will use during the game. This process is accomplished by sending and receiving Tag signatures using the directional transceivers during the T-minus countdown period, a time during which tag signatures would otherwise be meaningless as the game has not actually started yet. The Master sends a plurality of basic Tag Signatures which are received by the Slave, and the Slave responds by echoing a plurality of the same Tag Signature but with a different pattern of "extended Information" bits (1 extra tag point). If the Master receives the correct response, it considers the Cloning to have been successful and responds with a single tag signature of the same ID but having yet different "extended information" bits (2 extra tag points), and the Slave upon receiving this signature will consider the Cloning to have been successful. But if the Master does not receive the correct response, it sends a plurality of significantly different Tag Signatures to indicate that the process has failed and must be attempted again. Once the Master and Slave have determined that the Cloning process has been a success, they each divide the number-of-tags-until-out and the number of reloads available per player between themselves (the Master receiving the larger share if it cannot be evenly divided), and the two units will play through the programmed duration of the game with the same basic game definition and Player ID. Once the game has concluded, the Master may collect such data from the Slave as is needed for reporting back to the Host, allowing the Host to properly score a game in which the single player has used multiple game units to achieve his score.

Once the t-minus countdown reaches t-minus-zero (T-00) the game begins automatically and runs for the predetermined game duration or until the host declares an early end to the game (by beginning the debriefing/interrogation process early). During the game all signature interactions that are important to the game, such as tag signatures received, Zone area signatures received and the like are recorded by each unit so that the host unit may compare each player's and each team's gameplay after completion of the game. A player may be "tagged-out" before the game ends in which case his/her unit remains disabled until the end of the game and is then debriefed by the host just as if he/she had not been tagged-out.

When the game ends, the host then interrogates/queries all joiner units initially joined to the game for their recorded data. Each unit being interrogated then reports the requested gameplay data for that unit back to the host. The host combines all of the data received from each joiner unit, processes or otherwise analyzes the data and compares the results for each player (and also for the various teams, if applicable) in the game. The host then, based on the scoring parameters for the game, ranks all of the players and teams. Any joiner unit that is not debriefed by or otherwise does not communicate with the host after the game is treated as a unit that never joined the game. The compiled scores are ranked, and the resulting ranks are transmitted by the host to all joiners. Each player in the game can thus know one or more of the following: how well he or she performed individually (based on the objectives of the game), how well his or her team performed as a team (again based on the objectives of the game) and how well he or she performed individually versus each of the other individuals in the game (based on tags transmitted to the other players versus tags received from other players).

Exemplary Gameplay

CLASSIC LAZER TAG (LTAG)—The object of this game is to be the last player not tagged out. In the Classic LAZER TAG game, all other players are your opponents.

Preset game features include:
No Hosting, game starts immediately at T-10
No Teams or Player ID's
Any number of players may play
15 seconds of Shield time allowed
Unlimited Reloads
12 Mega-Tags
Players are tagged out after taking 10 Tags
No score ranking—last player NOT tagged out wins.
After being tagged out, a player's elapsed time in the game (from the start of the game to the time at which the player is tagged out) is displayed on the player's screen.

CUSTOM LAZER TAG (CUST)—The object of this game is to be the last player not tagged out, while scoring as many tags against your opponents as possible. In the Custom LAZER TAG game, all other players are your opponents. This variation of Classic LAZER TAG allows all game options to be programmable.

Game features include:
Fully hosted, (requires hosting/joining) and supports post-game debriefing
2-24 players may be in the game, players have individual ID's
No Teams, All players are opponents of each other
Time—1-99 minutes, (default=10 min)
Reloads—0-99 or Unlimited (default=Unlimited)
Mega-Tags—0-99 or Unlimited (default=10)
Shields—0-99 seconds (default=15)
Tags—1-99 (default=10)
Ranking is individual only 2-TEAM CUSTOMIZED LAZER TAG (2TMS) and 3-TEAM CUSTOMIZED LAZER TAG (3TMS)—The object of these games is to have the most number of your team's players remain in the game while scoring as many tags as possible on opposing players. In these games, some of the other players are on the same team as you, while others are on one or two opposing teams.

Game features of the foregoing team customized games include:
Fully hosted, (requires hosting/joining) and supports post-game debriefing
2 or 3 teams of up to 8 players per team
Team Tags (selectable)—Yes (Y) or No (N) (default=Y)
Medic Mode (selectable)—Yes (Y) or No (N) (default=Y)
Time—1-99 minutes, (default=15 min)
Reloads—0-99 or Unlimited (default=Unlimited)
Mega-Tags—0-99 or Unlimited (default=10)
Shields—0-99 seconds (default=15)
Tags—1-99 (default=20)
Ranking is individual and team HIDE AND SEEK (HDSK)—The object of this game is to score as many tags as possible on the other team while seeking them, and avoid taking tags while hiding from them. Players are divided into two teams. At any given time, one team is seeking while the other team is hiding. The teams switch between seeking and hiding every 60 seconds.

Game features include:
Fully hosted, (requires hosting/joining) and supports post-game debriefing
2 teams of up to 8 players per team
Team Tags (selectable)—Yes (Y) or No (N) (default=Y)
Medic Mode (selectable)—Yes (Y) or No (N) (default=Y)
Time—2-98 minutes (minutes in multiples of 2), (default=10 min)
Reloads—0-99 or Unlimited (default=5)
Mega-Tags—0-99 or Unlimited (default=15)
Shields—0-99 seconds (default=30)
Tags—1-99 (default=25)
Ranking is individual and team:

HUNT THE PREY (HUNT)—The object of this game is to score as many tags as possible on the other team while seeking them, and avoid taking as many tags as possible while hiding from them. This game is like Hide and Seek, but with the added complexity that players are divided into three teams. At any given time, your team will be hunting one team while hiding from the other team. Every 60 seconds the hunting direction switches so that you must now hide from the team you were just hunting and hunt the team you were just hiding from.

Game features include:
Fully hosted (requires hosting/joining) and supports post-game debriefing
3 Teams. Up to 8 players on each team
Team Tags (selectable)—Yes (Y) or No (N) (default=Y)
Medic Mode (selectable)—Yes (Y) or No (N) (default=Y)
Time—2-98 minutes (minutes in multiples of 2) (default=10 min)
Reloads—0-99 or Unlimited (default=5)
Mega-Tags—0-99 or Unlimited (default=15)
Shields—0-99 seconds (default=30)
Tags—1-99 (default=25)
Ranking is individual and team:

2-KINGS (2KNG) and 3-KINGS (3KNG)—The object of these games is to tag out the opposing team's King while protecting your own king. The Kings on any of the teams are not known to the other teams, but a clue is that the King's device will not send out an identifying (IFF) signal.

Game features include:
Fully hosted (requires hosting/joining) and supports post-game debriefing
2 or 3 Teams. Up to 8 players on each team
Team Tags (selectable)—Yes (Y) or No (N) (default=Y)
Medic Mode (selectable)—Yes (Y) or No (N) (default=Y)
Time—1-99 minutes (default=15 min for 2-KINGS, and 30 min for 3-KINGS)
Reloads—0-99 or Unlimited (default=20)
Mega-Tags—0-99 or Unlimited (default=00)
Shields—0-99 seconds (default=30)
Tags—1-99 (default=15)
Ranking is individual and team:

Zone Games—in Zone games the host's device becomes the Zone TAGGER. The Zone TAGGER does not participate in the game as a player although it still performs all set-up and programming functions and performs the debriefing at the end of the game. The Zone TAGGER creates the Zone by generating a 360° infrared light field using its omnidirectional transceiver. The Zone TAGGER should always be stationary during a game and positioned on a stable surface with the omnidirectional transceiver pointing straight up and level with the ground. The Zone TAGGER should be located in a place so that the Zone can fill a large area without obstructions that may create dead spots within the Zone.

All devices in the game operate to sense the Zone using their omnidirectional transceivers. Devices accumulate "Zone Time" whenever the device can sense the Zone and multiple players may be in the Zone at the same time. A player may remain in the Zone as long as he/she is not "Neutralized." When a player takes a tag from any other player, whether he/she is in the Zone or not, the tagged player becomes "Neutralized" for 15 seconds. The neutralized device will display "NEUT" on the device display and a fifteen-second countdown. A neutralized player cannot tag other players, be tagged by other players, raise shields or add Mega-Tag power. A neutralized player must leave the Zone within 5 seconds of being tagged and remain completely out of the Zone while neutralized. If a player stays in the Zone or returns to the Zone while neutralized, the Zone will become "hostile" to that neutralized player. A hostile Zone will cause a player's device to take multiple tags from the Zone at a pace fast that may completely tag out the neutralized player from the game within just a few seconds.

OWN THE ZONE (OWNZ)—The object of the game is to accumulate as much Zone Time as possible. Own the Zone is a strategic individual game where all players are opponents. Players should focus on getting into and staying in the Zone as long as possible without getting tagged, rather than attacking the opponents. The player with most Zone Time wins the game. It should be noted that multiple players can be in the Zone at the same time, as long as they can avoid getting tagged.

Game features include:
Fully hosted (requires hosting/joining) and supports post-game debriefing
2-24 players
No Teams. All players are opponents
Time—1-99 minutes, (default=10 min)
Reloads—0-99 or Unlimited (default=15)
Mega-Tags—0-99 or Unlimited, (default=0)
Shields—0-99 seconds (default=45)
Tags—1-99 (default=10)
Ranking is individual only 2-TEAMS OWN THE ZONE (2TOZ) and 3-TEAMS OWN THE ZONE (3TOZ)—The object of the game is to accumulate as much collective Zone Time as possible for the whole team. These two games are played in the same way as the Individual game of Own the Zone except that the players are divided into teams.

Figure 10:
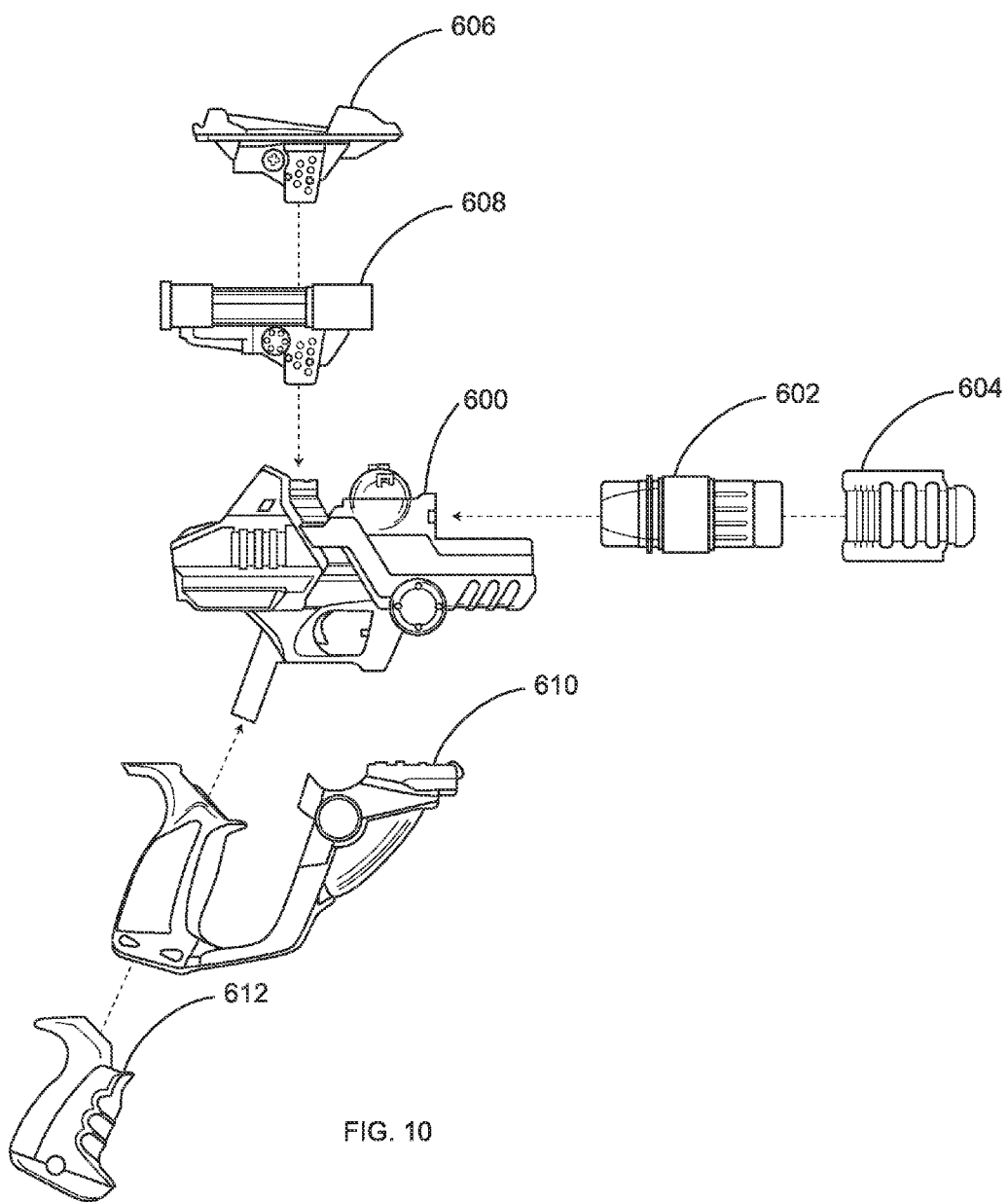
FIG. 10 is an assembly view of a combination infrared/photosensitive shooting device and samples of accessories.

Game features include:
Fully hosted, (requires hosting/joining) and supports post-game debriefing
2 or 3 Teams. Up to 8 players on each team
Team Tags—Yes (Y) or No (N) (default=Y)
Time—1-99 minutes, (default=15 min for 2-TEAMS OWN THE ZONE, and 20 min for S-TEAMS OWN THE ZONE)
Reloads—0-99 or Unlimited (default=15)
Mega-Tags —0-99 or Unlimited, (default=0)
Shields—0-99 seconds (default=45)
Tags—1-99 (default=10)
Score ranking is Individual and Team Referring now to FIG. 10, the hand held device 600 is shown with an assortment of accessories that may be removably coupled to the device 600. FIG. 10 shows two barrels, a narrow barrel 602 for narrow angle shooting and a wide barrel 604 for wide angle shooting, two sights, an iron sight 606 and a scope 608, and two grips, a shielded grip 610 and a pistol grip 612. Each different combination of barrel, scope, and grip provides a different accessory based configuration of the gun hardware and software operation, allowing for increased variation in weapon behavior and appearance.

In the preferred embodiments, the interfaces between the gun and the accessories may be accomplished via an "active rail" interface or an "intelligent rail" interface.

In the active rail interface, the gun is able to sense the presence or absence of the accessory, and possibly identify the specific accessory present from amongst a list of possible accessories programmed into the gun software in advance. A sensor may be used to detect presence of such apparatus coupled to device, and the electronic controller disposed with software changes the function of the device based on the presence or absence of apparatus. The sensor is provided with appropriate sensing means and may comprise one or more switches. The gun modifies its software functions in a predetermined manner according to the specific combination of accessories which it has detected. The apparatus is thus removably coupled to the device, with the apparatus sending an identifying signal to said first electronic controller when coupled to the device. The device accordingly is provides with at least one game play configuration definition, and its controller may send the game play configuration definition with the combination of one or more apparatus, modifying the game play configuration definition at the electronic controller. The accessory may also alter the electronic circuit of the gun directly, in a manner not directly detected by the gun's processor.

In the intelligent rail interface, the accessory contains a processor and the rail provides for a bi-directional communications link between each accessory's processor and the gun's processor. In this system, the accessory directs how the gun's software will react to the presence of the accessory by directing the gun's software operation. It is this advancement that makes the intelligent system so flexible. The details of exactly what each accessory or combination of accessories will do to the gun's software and hardware functioning does not have to be determined in advance. The line of accessories does not have to be planned out in advance since it is the accessory itself (rather than the gun) that decides how the gun will react to the accessory's presence. Each accessory commands the gun's software to modify whichever element or elements are appropriate.

Active Rail Interface

Upon coupling one or more of the accessories to the device 600, identifying signals are received by a first electronic controller in the device 600 so that the controller may determine which accessories are present. Consequently, the first electronic controller may determine how the software configuration will be modified to best match the combination of accessories present and any effect they may have on the hardware configuration.

The narrow barrel 602 and the wide barrel 604 may also contain an infrared source and collimating lenses as well as circuitry to inhibit the generation of an infrared signal from the device 600 and instead generate it from within the barrel 602, 604. This setup provides the ability to have great variation in the use of the infrared signals with the infrared sources used independently or in combination. Thus, many different weapon types may be simulated.

Accessories such as barrels 602, 604 may further contain circuitry which acts in conjunction with the transmitter section of device 600 to alter the transmitter circuit so as to cause the IR to be generated from an emitter or emitters located in the barrel 602, 604 rather than from the emitter or emitters located in device 600. This would be done so as to allow the emitters in barrels 602, 604 to be matched with lenses or such other optical elements as may be required to produce the exact beam pattern desired, for example to match the visual appearance of the barrel. Further, other accessories such as TV game modules (as discussed later in this description) may use this feature to inhibit IR generation in device 600 when playing against opponents or targets which are merely simulated and have no physical reality, and, further, the signals present within the transmitter circuitry may be monitored by the accessory device for the purposes of determining when the player has directed the device to fire a tag, etc. In addition, this allows for accessories such as simulated land mines or grenades to capture and record the tag signature of the host device and re-transmit it at a later time using their own IR transmitter circuitry.

Figure 11A:
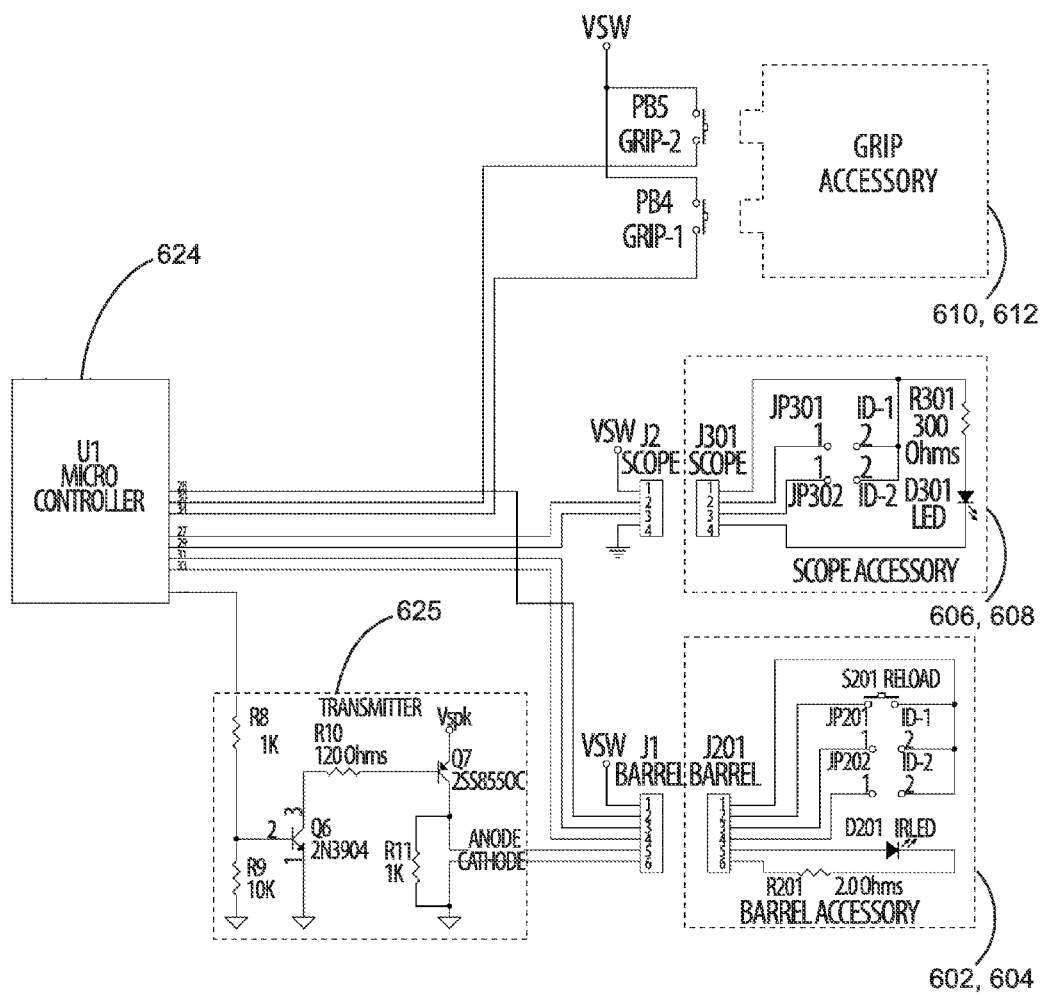
FIG. 11A is a schematic for attaching accessories in an active rail system.

FIG. 11A shows a schematic for attaching accessories in an active rail system. FIG. 11A shows how in one embodiment the various accessories attach to the device 600 and how the first electronic controller 624 detects which accessories are attached. Specifically, this figure displays how the aforementioned grip accessories 610, 612, the scope accessories 606, 608, and the barrel accessories 602, 604 are detected by the first electronic controller 624. Further, this figure shows how the barrel accessories 602, 604 also interact with the directional infrared transmitter 625.

Each combination of barrel, sight, and grip affects six different variables that define the device 600 behavior. These variables are pattern, hit points, rate of fire, burst size, magazine size, and shield time.

Pattern is a hardware function of the lens and the current level used to drive the infrared emitting diode (IRLED) which generates the tag signatures. The lens, the IRLED, and the resistor which controls the current through the IRLED of the preferred embodiment of the "active rail" system are all integral to the barrel accessory 602, 604. However it will be appreciated that any or all of these elements could be integral to the device 600 and selected or not by micro-controller 624 and/or circuitry within the barrel accessory 602, 604, dependant on the specific accessories attached to device 600. The various patterns that may be used in the preferred embodiment are a 100' wide angle shot, a 200' wide angle shot, a 300' narrow angle shot, and a 400' narrow angle shot.

Hit points is a software function that controls how many "Mega Tag" points are to be indicated in the tag as described in Table 2.

Rate of fire is a software function that controls how rapidly one shot (tag) may follow the previous shot (tag).

Burst size is a software function that controls the number of shots that will be fired if the player holds the trigger.

Magazine size is a software function that determines the number of shots that may be fired before the device 600 must be reloaded.

Shield time is a software function that determines or modifies the total number of seconds of shield time available to the player at the start of the game.

The next several paragraphs provide examples of how the different combinations of accessories configure the device hardware and software in order to roughly simulate different types of weapons.

When the wide barrel 604, the iron sight 606, and the pistol grip 612 are attached to the device 600, the gun may have the following characteristics: 1) the pattern will be a 100' wide angle shot; 2) there will be 1 hit point per tag; 3) the rate of fire will be 4 tags per second; 4) the burst size will be 1 tag per trigger pull; 5) the magazine will not need reloading; and 6) the shield time will be twice the shield time programmed at the start of the game. This configuration simulates a fantasy type pistol that never needs reloading.

When the narrow barrel 602, the iron sight 606, and the pistol grip 612 are attached to the device 600, the gun may have the following characteristics: 1) the pattern will be a 300' narrow angle shot; 2) there will be 2 hit points per tag; 3) the rate of fire will be 4 tags per second; 4) the burst size will be 1 tag per trigger pull; 5) the magazine will need reloading after 10 shots; and 6) the shield time will be the shield time programmed at the start of the game. This configuration simulates a semi-automatic carbine.

When the wide barrel 604, the scope 608, and the pistol grip 612 are attached to the device 600, the gun may have the following characteristics: 1) the pattern will be a 200' wide angle shot; 2) there will be 2 hit points per tag; 3) the rate of fire will be 4 tags per second; 4) the burst size will be 1 tag per trigger pull; 5) the magazine will need reloading after 10 shots; and 6) the shield time will be the shield time programmed at the start of the game. This configuration simulates a semi-automatic pistol.

When the narrow barrel 602, the scope 608, and the pistol grip 612 are attached to the device 600, the gun may have the following characteristics: 1) the pattern will be a 400' narrow angle shot; 2) there will be 4 hit points per tag; 3) the rate of fire will be 1 tag per second; 4) the burst size will be 1 tag per trigger pull; 5) the magazine will need reloading after 1 shot; and 6) the shield time will be the shield time programmed at the start of the game. This configuration simulates a bolt-action (single shot) sniper rifle.

When the narrow barrel 602, the scope 608, and the shield grip 610 are attached to the device 600, the gun may have the following characteristics: 1) the pattern will be a 400' narrow angle shot; 2) there will be 2 hit points per tag; 3) the rate of fire will be 2 tags per second; 4) the burst size will be 1 tag per trigger pull; 5) the magazine will need reloading after 5 shots; and 6) the shield time will be the shield time programmed at the start of the game. This configuration simulates a semi-automatic sniper rifle.

When the wide barrel 604, the scope 608, and the shield grip 610 are attached to the device 600, the gun may have the following characteristics: 1) the pattern will be a 200' wide angle shot; 2) there will be 1 hit point per tag; 3) the rate of fire will be 5 tags per second; 4) the burst size will be 5 tags per trigger pull; 5) the magazine will need reloading after 20 shots; and 6) the shield time will be one-half the shield time programmed at the start of the game. This configuration simulates a sub-machine gun.

When the narrow barrel 602, the iron sight 606, and the shield grip 610 are attached to the device 600, the gun may have the following characteristics: 1) the pattern will be a 300' narrow angle shot; 2) there will be 1 hit point per tag; 3) the rate of fire will be 6 tags per second; 4) the burst size will be 10 tags per trigger pull; 5) the magazine will need reloading after 10 shots; and 6) there will be no shield time. This configuration simulates an assault rifle.

When the wide barrel 604, the iron sight 606, and the shield grip 610 are attached to the device 600, the gun may have the following characteristics: 1) the pattern will be a 100' wide angle shot; 2) there will be 1 hit point per tag; 3) the rate of fire will be 8 tags per second; 4) the burst size will be 10 tags per trigger pull; 5) the magazine will need reloading after 10 shots; and 6) the shield time will be the shield time programmed at the start of the game. This configuration simulates a machine pistol.

Intelligent Rail Interface

Figure 12A:
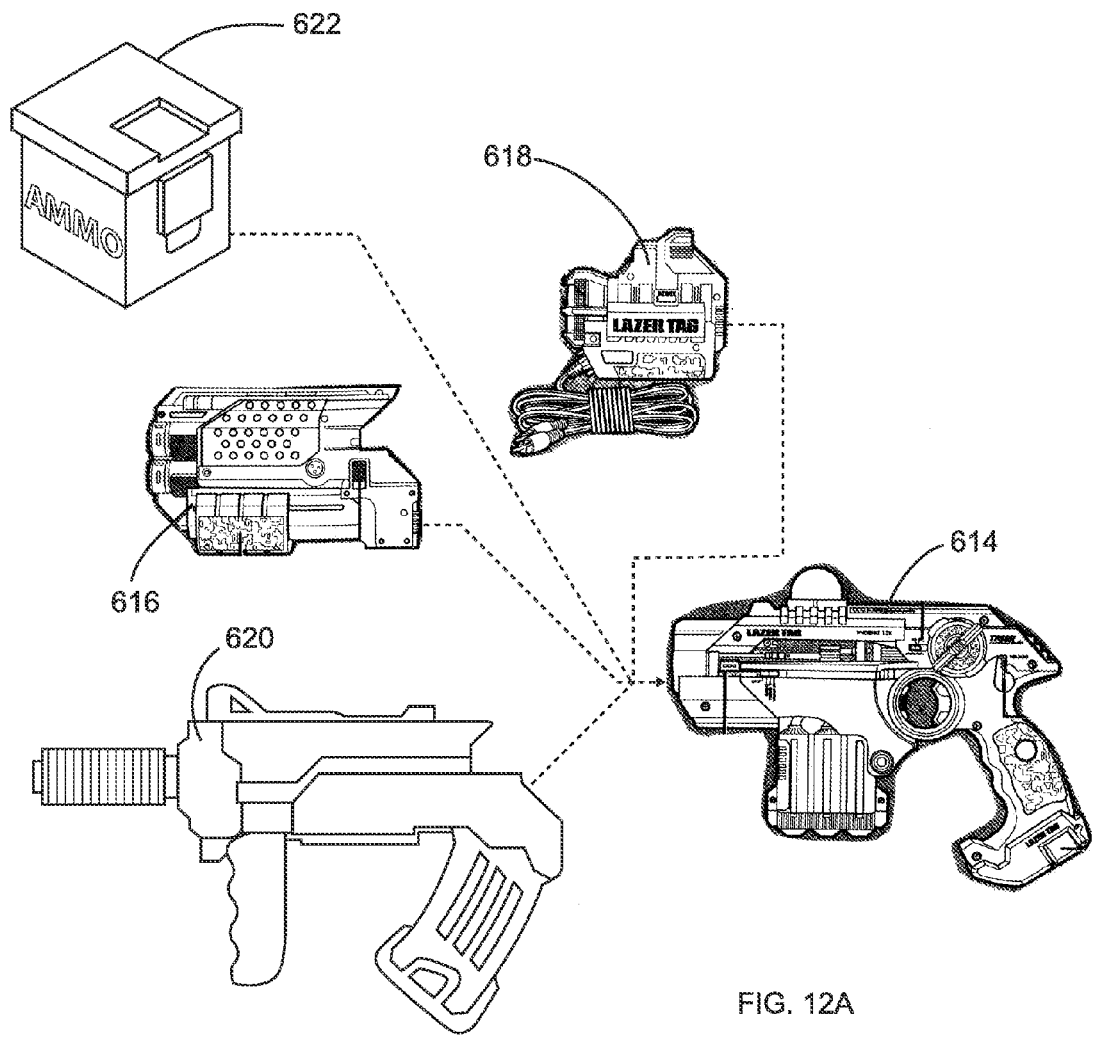
FIG. 12A is an assembly view of an intelligent rail system including the basic gun and a number of accessories.

As an example of the intelligent rail interface, referring to FIG. 12A, the accessories 616-620 each contain a second electronic controller so that when the accessory is attached to the device 614 there will be a bidirectional channel facilitating communication between the first electronic controller and the second electronic controller. This may be accomplished with dual serial ports. This setup allows intelligent processor-to-processor communications between the gun and the accessory. As such, this system provides flexibility and may allow the accessory to perform communications based functions such as game definition, scoring, "healing" players, and re-arming in games with limited ammunition.

Figure 11B:
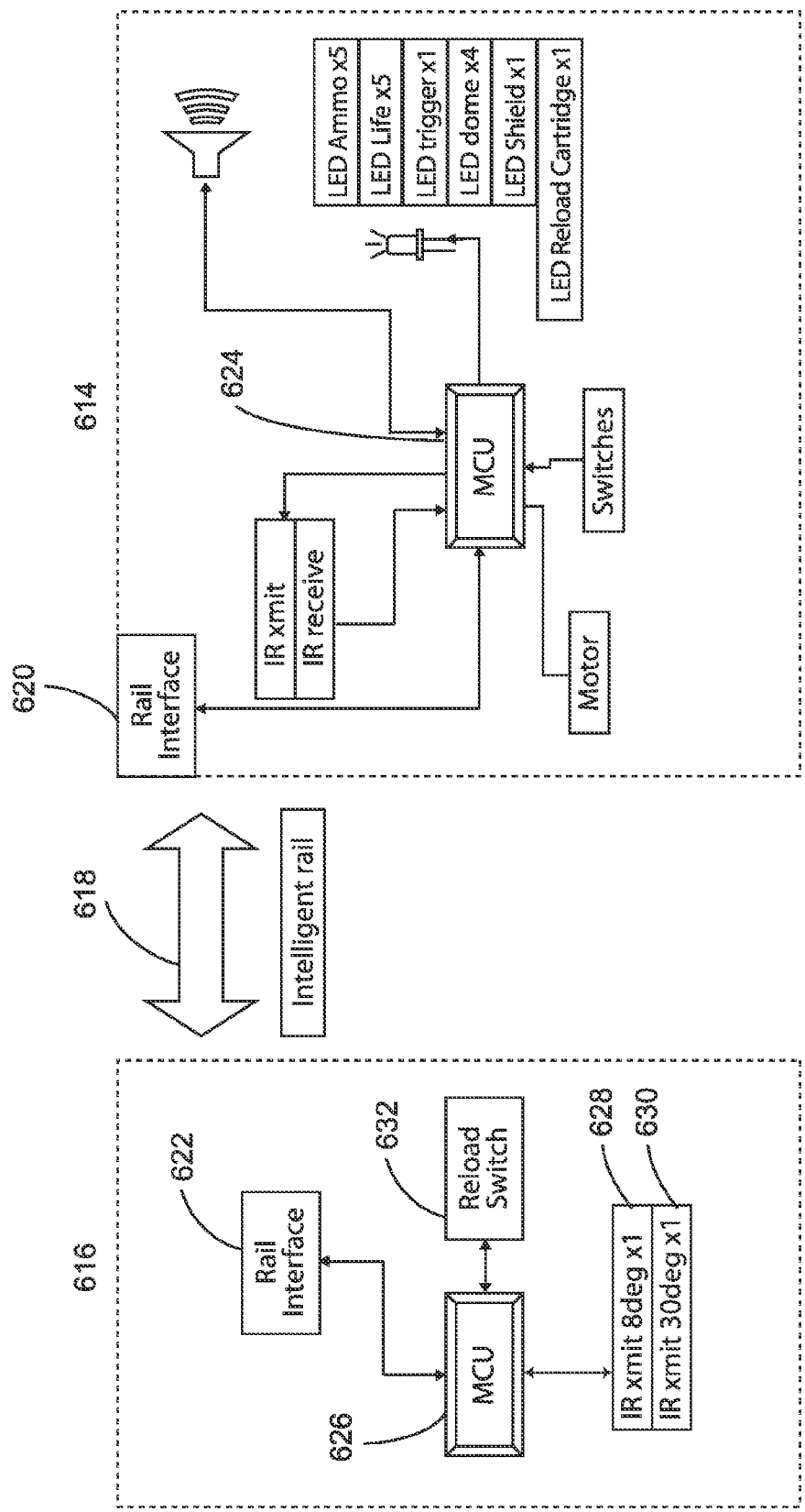
FIG. 11B is a block diagram of the intelligent rail system used for communication between the shooting device and the accessories.

FIG. 11B shows a schematic block diagram of the intelligent rail system used for communication between the shooting device and the accessories. In this example, the accessory described is the shotgun barrel. In FIG. 11B, the dotted-lined box on the right represents the device 614, and the dotted-lined box on the left represents the shotgun barrel accessory 616. The device 614 contains a first electronic controller 624 and the shotgun barrel accessory 616 contains a second electronic controller 626. The bidirectional channel facilitating communications between the first electronic controller 624 and the second electronic controller 626 is shown as the intelligent rail 618. Additionally, the micro-controllers 624, 626 each contain software to control the intelligent rail interfaces 620, 622.

As an example of the use of the intelligent rail system, a shotgun module may be attached to the device 614. When the shotgun module is attached an exchange of data occurs between micro-controllers 624, 626 and as a result micro-controller 624 is made aware of the presence of the shotgun accessory 616. When the shotgun barrel 616 is "pumped" by activating the shotgun reload switch 632, micro-controller 626 sends a command to micro-controller 624 to alter the manner in which it responds to the trigger input of device 614. As a result, device 614 will now fire two shots in response to the next trigger pull rather than the customary single shot, and the first of the two shots is a two-point Mega Tag, while the second shot is a standard single-point tag. The shotgun barrel micro-controller 626 inhibits the generation of the infrared signal from the device 614, intercepts the signature data from the device 614, and generates a first infrared signature through a wide angle LED 630 in the shotgun barrel. The shotgun barrel micro-controller 626 then generates a second infrared signature through a narrow angle LED 628 in the shotgun barrel. This produces a shotgun-like pattern. The device 614 then reverts back to a semi-automatic mode and the shotgun module ceases interception or inhibition of the signals from device 614 until the shotgun barrel is pumped again. Other barrel accessories such as machinegun barrel 620 may function in a similar manner but have only a single IRLED and lens, and when pumped command micro-controller 624 to change from semi-automatic firing at a rate of 4 tags per second to fully-automatic firing at a rate of 8 tags per second for the next 10 shots. Non-barrel accessories such as Ammo Box 622 may act to replenish game resources such as ammunition, health, or shields time by sending commands to micro-controller 624 to increase the respective values in memory which represent these resources.

The aforementioned accessories may be interchangeable during game play to alter the hardware and software operation during a particular game. Thus, the player may have added strategic considerations during a game by being able to choose the best characteristics of a simulated weapon to fit a particular battle situation. The device 614 may contain memory for the purpose of recording the number of times a given accessory is used during a particular game. This data may be used to limit or record the number of uses of such an accessory by each player during the game.

Video Game Attachment

Figure 12B:
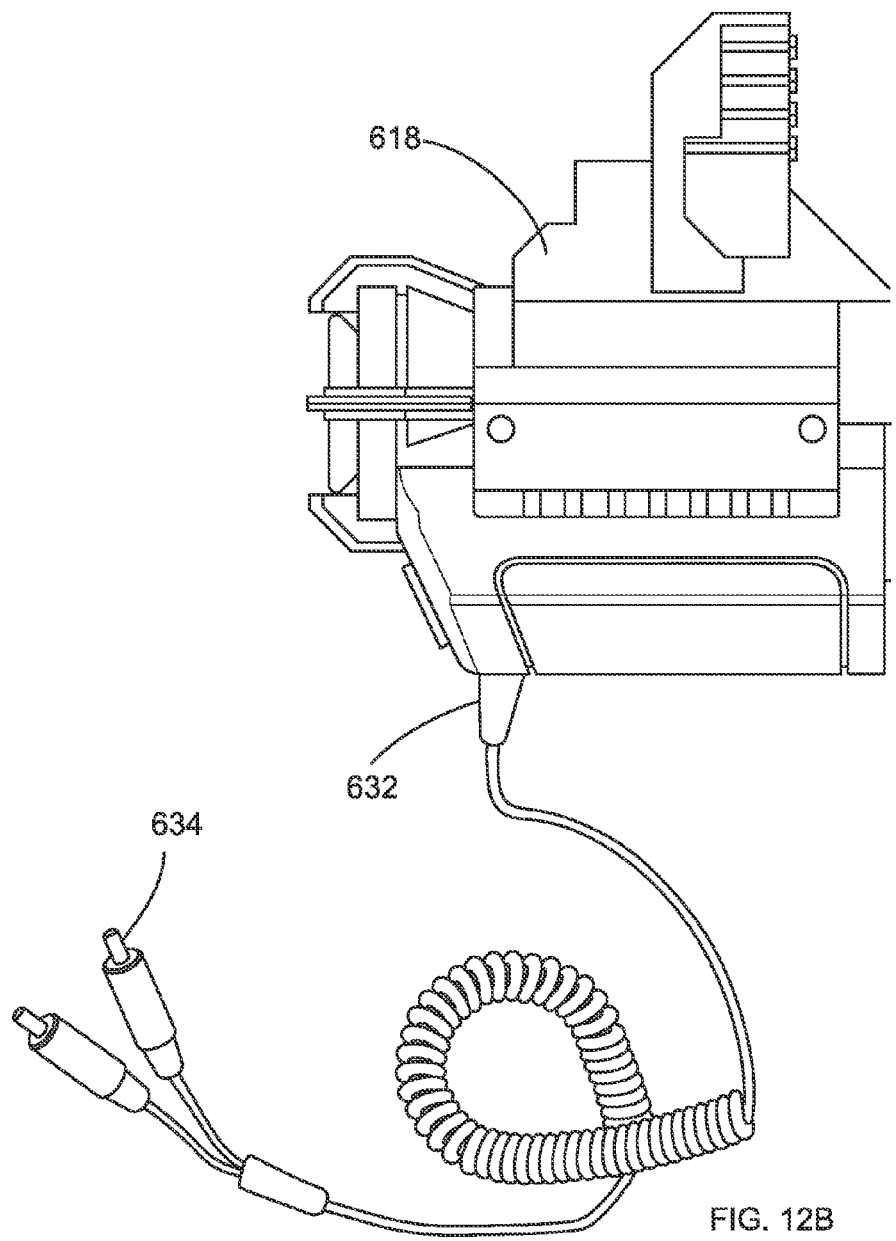
FIG. 12B is a detail assembly view of the video-game accessory for the intelligent rail system of FIG. 12A.

Referring now to FIG. 12B, a perspective view of the accessory device 618 with connecting cables 632 for use as a photosensitive light detecting video game device is shown. For using the device 614 to allow a single player to play a shooting type video game, the accessory device 618 houses a light detector for sensing at a distance raster scan segments on the screen of a raster scan display. The light detector is built into the accessory device 618. The video game processor may use the light detector and a trigger signal from device 614 to determine the orientation of the weapon housing and where the gun was pointing when the player pulled the trigger. Both video and audio output may be transmitted to the raster scan display using standard RCA cables 632-634.

Figure 13:
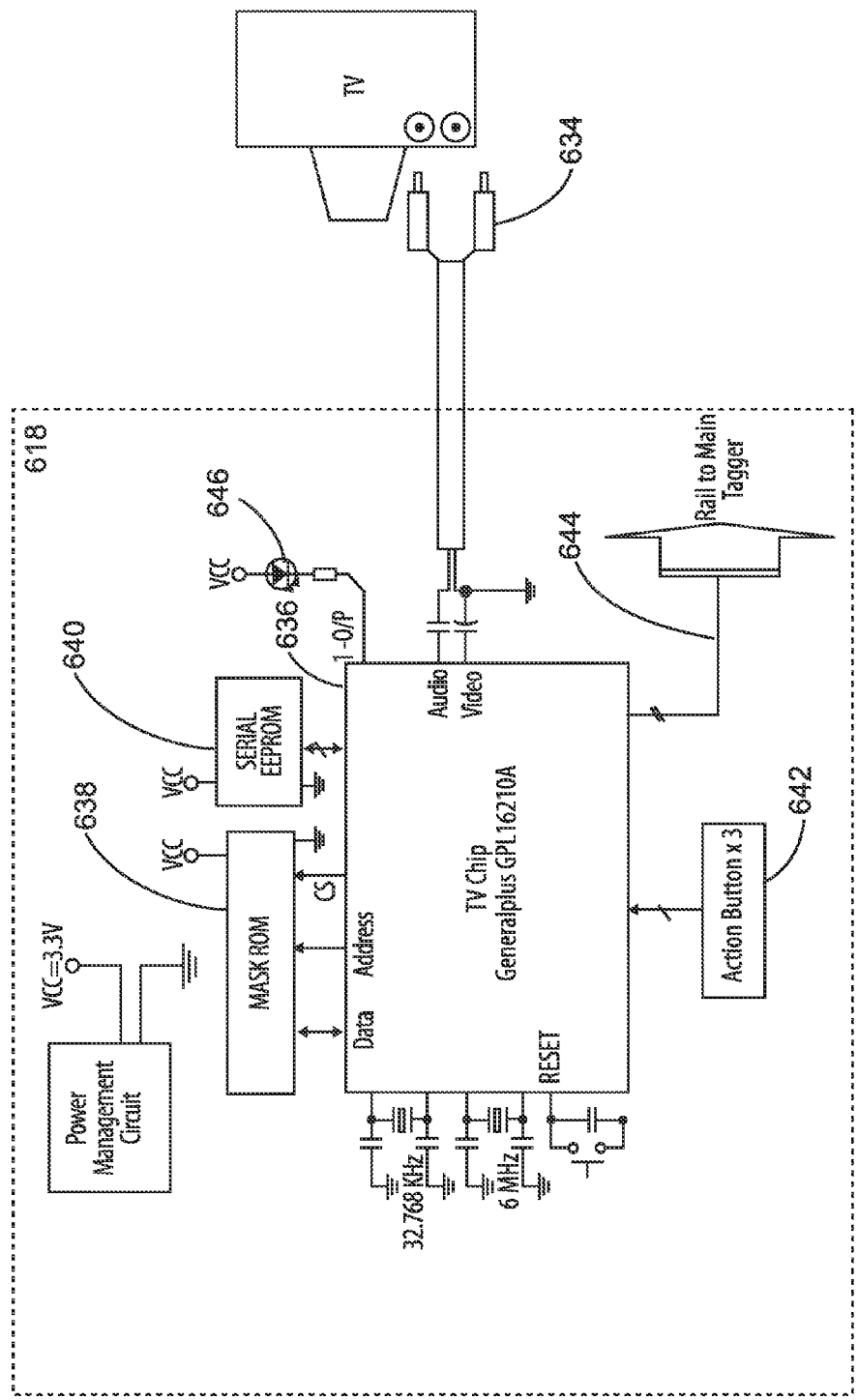
FIG. 13 is a schematic diagram of a video game processor used during single player game play when attached to a raster scan display.

FIG. 13 is a schematic diagram of a video game processor used during single player game play when attached to a raster scan display. The video game processor is built into the housing for generating video output to display simulated players and scenery on the screen. FIG. 13 shows that the video controller uses a Generalplus GPL16210A TV chip as the video game processor controller, however other like controllers may be used. The TV chip interfaces with a ROM 638 via a data bus and an address bus, a serial EEPROM 640 via i/o channels, and three action buttons 642 via i/o channels. FIG. 13 also shows several I/O channels 644 used for communication with the device 614 micro-controller 624, and a dual RCA connection 634 for audio and video signals to be sent to the display. In operation, signals are sent from micro-controller 624 of device 614 via the intelligent rail interface to TV video game processor chip 636 of device 618, indicative of the user actuating the various inputs of device 614 such as trigger, shield, and reload. The video game processor 636 then uses this information combined with data from the photo sensor 646 to determine if the trigger pull coincided with aiming at a simulated opponent image on the screen, and if so then a hit is tallied for the player. A data structure which simulates players may operate within the video game processor to generate video output displaying at least one of the simulated players shooting at the live player. The data structure will determine whether the simulated player hit the live player. If the video game processor 636 judges that a simulated opponent has fired a tag which hit the live player, then it may alert micro-controller 624 of device 614 of this fact by sending messages across the intelligent rail interface. By sending commands and messages across the intelligent rail interface, video game processor 636 may direct the device 614 to produce audible, visible, and tactile outputs in response to game events just as it would do had a tag been received during a normal game between two or more players, or the video game processor may command the device 614 to not produce such responses and instead video game processor 636 may instead simulate such responses as part of the displayed video and audio signals output via cable 632.

Intelligent Rail Augmented Reality Interface

Figure 14:
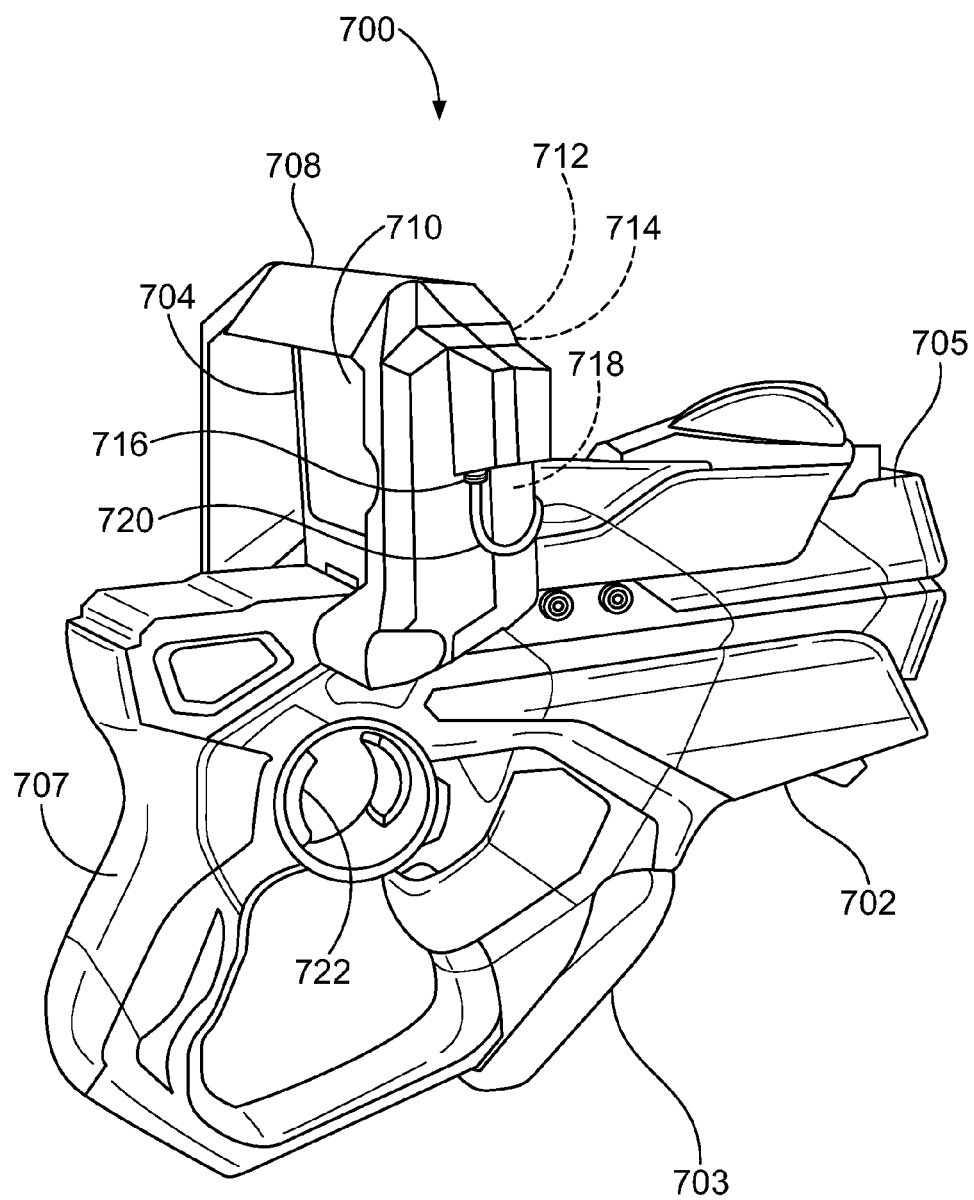
FIG. 14 is a perspective view of an exemplary infrared shooting game device with a removably coupled mobile electronic device.

The intelligent rail interface may also be used with a mobile electronic device, such as an iPhone™, iTouch™, Android™ phone or other smart phone, as the accessory to provide augmented reality gaming for a single player to train or for multiple players. FIG. 14 is a perspective view of an exemplary infrared shooting game device with a removably coupled mobile electronic device. In a described embodiment, the device 700 has a shaped housing 702, a first directional infrared transmitter disposed within the housing for transmitting directional IR data using a narrow light beam, a first omni-directional field of view receiver disposed within the housing to receive IR data and a first electronic controller disposed within the housing. A first apparatus 704, or mobile electronic device, is removably coupled to the housing a bracket 706 and cowl 708 to hold the first apparatus 704. The first apparatus 704 has a camera 714 that has a field of view through a camera hole 712 in the bracket 706 and cowl 708. The first apparatus 704 also has a display 710 that has a touch screen interface.

The first apparatus 704 also has a second electronic controller and when the first apparatus 704 is coupled to the housing 702 communications between the device and the apparatus is enabled. In a described embodiment, the communication between the device and the apparatus begins after the first electronic controller sends a carrier signal to the second controller for handshake communications. The first apparatus further has a sensor that produces data defining the real-time spatial orientation of the first apparatus. A first data structure stores the data defining the real-time spatial orientation of the first apparatus 704; a second data structure stores data defining one or more virtual objects; and a third data structure stores data defining the real-time spatial orientation of the one or more virtual objects relative to the real-time spatial orientation of the first apparatus 704. A first memory stores a real-time image of the field of view 714; a second memory stores a real-time image of the one or more virtual objects that are positioned such that the real-time spatial orientation of the one or more virtual objects relative to the real-time spatial orientation of the first apparatus 704 is within the field of view 714; and a third memory stores a software program controlled by the second electronic controller that causes the image in the first memory to be shown on the display 710 and the image in the second memory to be superimposed over the image in the first memory on the display 710. This allows the combination of the real-time image of the field of view 714 and the virtual objects to provide an augmented reality experience.

Still referring to FIG. 14, the device 700 has a bidirectional channel facilitating communication between the first electronic controller in the housing 702 and the second electronic controller in the first apparatus 704. This communication is accomplished by connecting the apparatus communications connector 716 and the housing communications connector 718 with a communications cable 720 connecting the first apparatus 704 to the hand held device 700 as the bidirectional channel facilitating communication between the first electronic controller and the second electronic controller. The device 700 further has one or more triggers 722 that, when depressed, causes a signal to be sent to the first apparatus 704 so that the first apparatus can respond.

In some embodiments, the shaped housing 702 may have a body section 703, a barrel section 705 and a grip section 707. A first infrared transmitter is located in the barrel section 705 and produces a substantially directional beam projecting forward from the housing 702. A first infrared receiver is located in the barrel section 705 and has a narrow field of view looking forward of the housing 702 and parallel to the beam of the first infrared transmitter. A second infrared transmitter is located on top of or within the body section 703 and has an omni-directional pattern which illuminates an area approximately 360 degrees about the body section 703. A second infrared receiver is located on top of or within the body section 703 and has an omni-directional view approximately 360 degrees about the housing 702. A first electronic controller is disposed within the housing 702 and connected electrically to the first and second infrared transmitters and first and second infrared receivers. In some embodiments, an input device is connected to the first electronic controller and receives commands from the human player, and an output device is used for outputting status information to the human player. In other embodiments, user input and output is handled by the second controller or a combination of the first controller and the second controller.

The bidirectional channel facilitates communication between the first electronic controller and the second electronic controller. The hand held device 700 may have a fourth data structure for storing data defining a real-time virtual shot trajectory originating from the hand held device 700 and in response to a first signal from the first electronic controller to the second electronic controller, the software program causes a shot image to travel across the display 710 along the real-time virtual shot trajectory superimposed over the image shown on the display 710. When the shot image crosses a virtual object, the software program causes a graphical animation to appear on the display 710 superimposed over the real-time image of the field of view 714. During game play, the one or more virtual objects travel within the display, and the software program causes the one or more virtual objects to shoot a virtual shot towards the participant using the hand held device 700. The combination of the data in the first data structure, the second data structure and the third data structure determine whether the participant using the hand held device 700 is hit by the virtual shot from the virtual object. In response to a second signal from the first electronic controller to the second electronic controller, the software program receives game-related data sent from the first electronic controller to the second electronic controller and superimposes the game-related data over the real-time image of the field of view 714. Thus, the device 700 provides for augmented reality gaming in conjunction with multiplayer Lazer Tag.

The hand held device 700 may use a cable 720 to couple the first apparatus 704 to the hand held device 700 as the bidirectional channel facilitating communication between the first electronic controller and the second electronic controller. The hand held device 700 may further use a speaker to provide audio feedback controlled by the software program and use a touch screen display 710 for user input through the second controller.

Figure 15A:
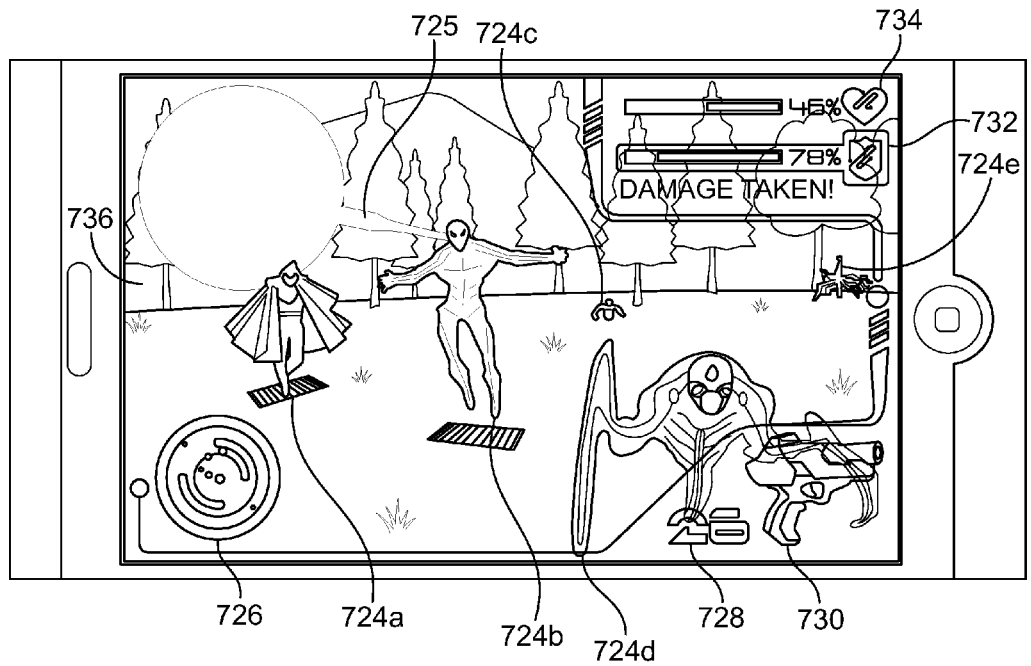
FIGS. 15A and 15B are screen shots from the display on the first apparatus during a solo augmented reality game.

FIG. 15A is a screen shot from the display on the first apparatus during a solo augmented reality game with virtual opponents 724*a-e*. The virtual opponents 724*a-e*, described as virtual objects above, appear superimposed over the real-time background 736 to provide the augmented reality. A game player may shoot at the virtual opponents 724*a-e* by pulling the trigger 722 on the device 700 and creating a virtual shot. The virtual shot will move across the screen, and, if a virtual opponent 724*a-e* is hit, an animation will appear indicating the tag. A virtual opponent shot 725 appears on the display 710 to simulate one of the virtual opponents 724*a-e* shooting at the real player. The virtual opponents 724*a-e* are superimposed over the real-time background 736 using the second electronic controller. Also superimposed over the real-time background 736 are a radar 726 that shows the positions of the virtual opponents 724*a-e*, time remaining 728 in the game, the weapon selected 730, the damage taken 732 and the health remaining 734 as a percentage.

Figure 15B:
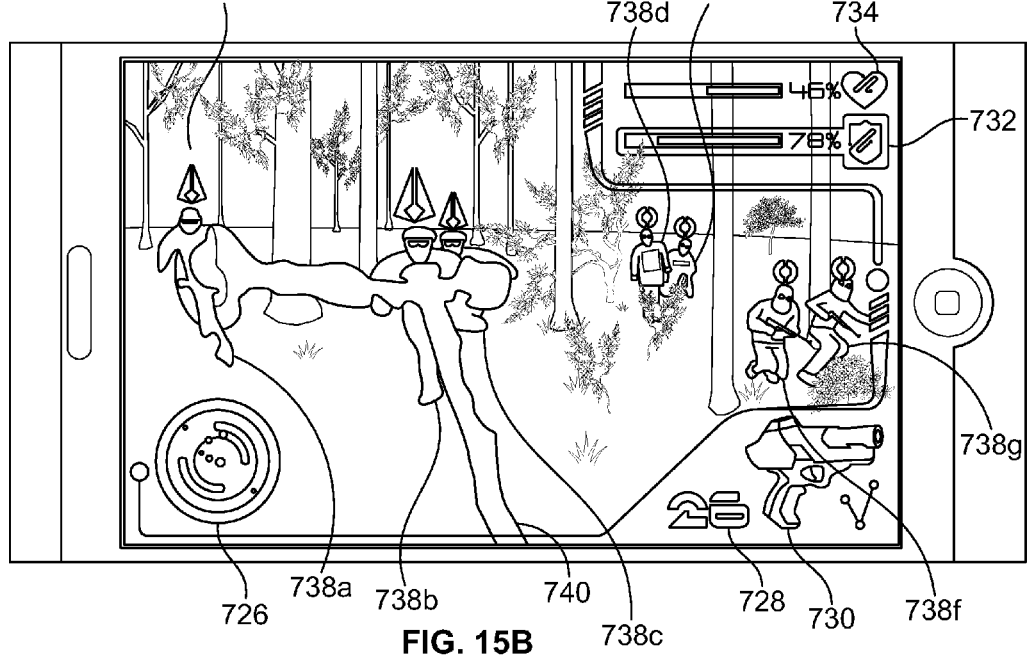

FIG. 15B is a screen shot from the display on the first apparatus during a multiplayer augmented reality game with real opponents 738*a-g*. The real opponents 738*a-g* appear in the real-time background 736. A game player may shoot at any one of the real opponents 738*a-g* by pulling the trigger 722 on the device 700 and creating a virtual shot 740. The virtual shot 740 will move across the screen, and, if any of the real opponents 738*a-g* is hit, an additional animation will appear on the screen indicating the tag. The virtual shots 740 are superimposed over the real-time background 736 using the second electronic controller. In FIG. 15B, the virtual shot 740 is displayed as a lightning bolt and shows that the virtual shot 740 tagged three people. Also superimposed over the real-time background 736 are a radar 726 that shows the positions of the real opponents 738*a-g*, time remaining 728 in the game, the weapon selected 730, the damage taken 732 and the health remaining 734 as a percentage.

Through FIG. 16A-FIG. 16D and FIG. 17A-FIG. 17C and the following, an exemplary iOS game is described. In the exemplary game, tagger events and status information will be shown on the display, and the user will be able to control certain tagger functions from the iOS device. Also, augmented reality game play may be superimposed on top of the real world tag game.

When beginning the game play, the user has some options through a standard iOS menu interface. In an exemplary first screen, a menu appears allowing a player to host a game, to join an existing game, to start an unhosted game or to define a player profile. If a player chooses to host a game by touching the appropriate menu area on the touch screen, then options such as "Game Type", "Game Options" and "Invite Guests" may appear. If a player selects "Game Type", then a variety of game types may appear for individual, team or zone control type play. Once the game type is selected, the player may return to the previous menu and select "Invite Guests" to invite players to join the game as instructed on the display. Other players will receive instructions on their displays for joining the game to which they were invited. In an unhosted game, the player may join a game where every player fends for himself or herself and no scoring or player names are tracked. If a player is defining a player profile, the player may have the option to select a name, choose team affiliation, select weapons to use, and configure shield use, among other possible options. Once a game is initiated, a countdown will occur and the game will start when the countdown is finished.

Figure 16A:
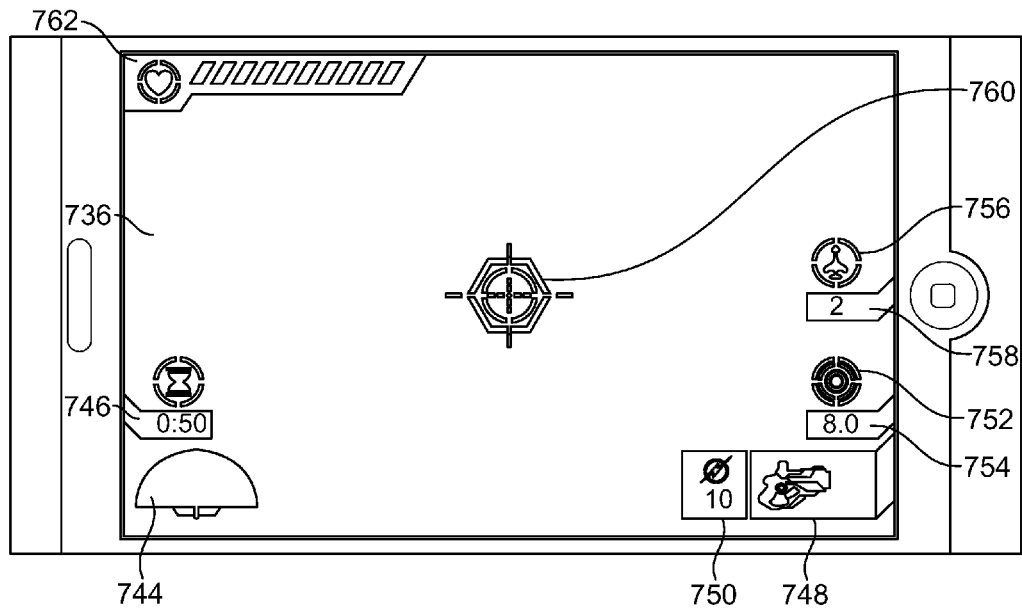
FIG. 16A is a screen shot from the display on the first apparatus during a multiplayer augmented reality game with no players in the field of view.

Once the countdown is finished and the game starts, the main display is a Heads Up Display. FIG. 16A is a screen shot from the display on the first apparatus during a multiplayer augmented reality game with no players in the field of view and demonstrates the Heads Up Display. The Heads Up Display shows the real-time field of view with game parameters superimposed so the player can track status. FIG. 16A shows a different style of presenting the augmented reality over the real-time background than shown earlier. In the lower left-hand corner of the display, a hemispherical radar 744 is shown with no opponents, which corresponds to having no opponents in the field of view. Also shown in the lower left-hand corner is the game time remaining 746. In the right-hand corner, the game player sees the weapon selected 748 and the amount of clip ammunition remaining 750. Also in the right-hand corner, the game player sees a shield icon 752 to indicate that a shield is available and the shield time remaining 754. The player further sees an air strike icon 756 to indicate that air strikes are available and the number of air strikes remaining 758. How the augmented reality air strikes operate is described below. In the upper left-hand corner of FIG. 16A, a health remaining 762 bar graph is shown. During game play, if a game player is tagged, the health remaining 762 diminishes. During some augmented reality games, the health remaining 762 may increase with certain activities. Lastly, the center of FIG. 16A shows a target sight 760 that shows where a game player's shots will travel and will indicate when an opponent, virtual or real, is within firing range.

Figure 16B:
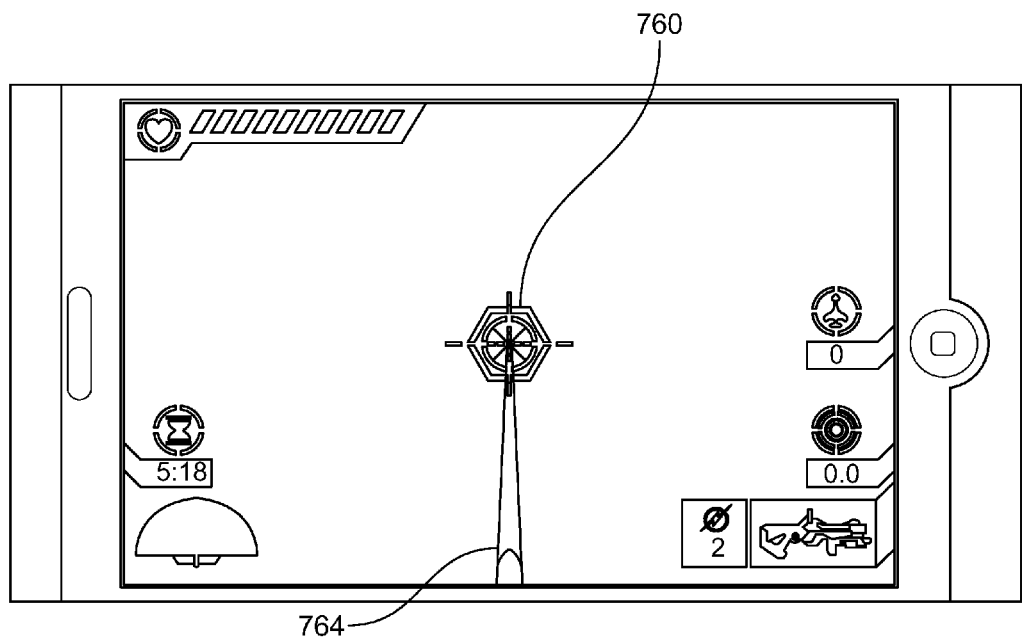
FIG. 16B is a screen shot from the display on the first apparatus during a multiplayer augmented reality game with a virtual shot animation superimposed over the real-time field of view.

FIG. 16B is a screen shot from the display on the first apparatus during a multiplayer augmented reality game with a virtual shot animation superimposed over the real-time field of view. When the player pulls the trigger on the device 700 to fire a shot, a virtual shot animation 764 appears that emanates from the bottom of the display and vanishes into the target sight 760. In the exemplary game, a firing sound is heard when the shot is fired.

Figure 16C:
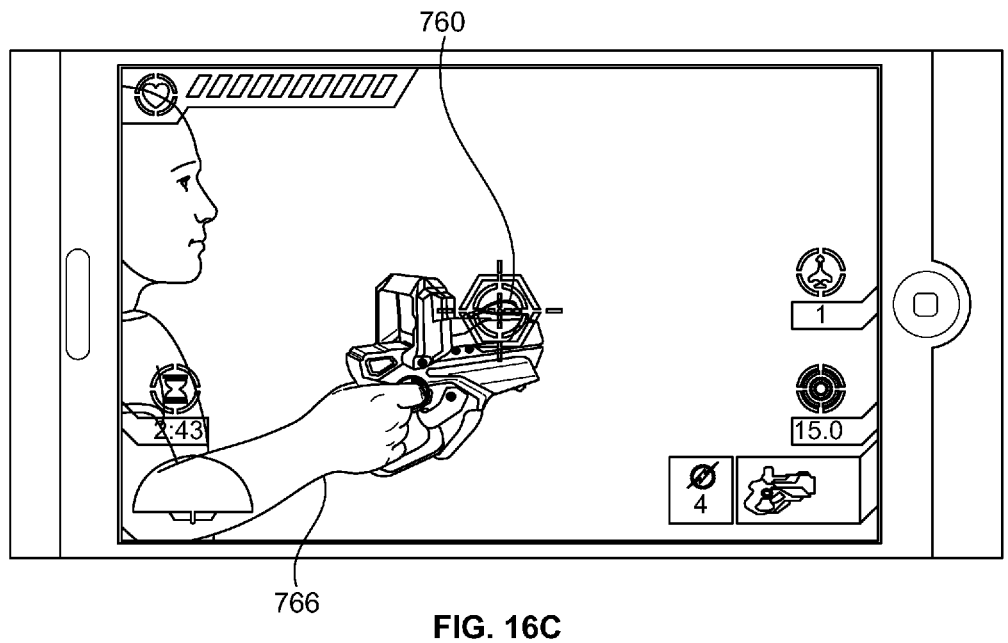
FIG. 16C is a screen shot from the display on the first apparatus during a multiplayer augmented reality game with an opposing player in the field of view.

FIG. 16C is a screen shot from the display on the first apparatus during a multiplayer augmented reality game with an opposing player in the field of view. When the player has locked on to an opponent 766, the target sight 760 changes color, for example from white to red, and in an exemplary hosted game, the opponent's 766 name appears at the top of the screen and a sound is heard indicating the locked on status.

Also in the exemplary game, if the opponent 766 has his or her shield up, then the target sight 760 and the opponent's 766 name are shown in a third color and a corresponding sound is heard.

Figure 16D:
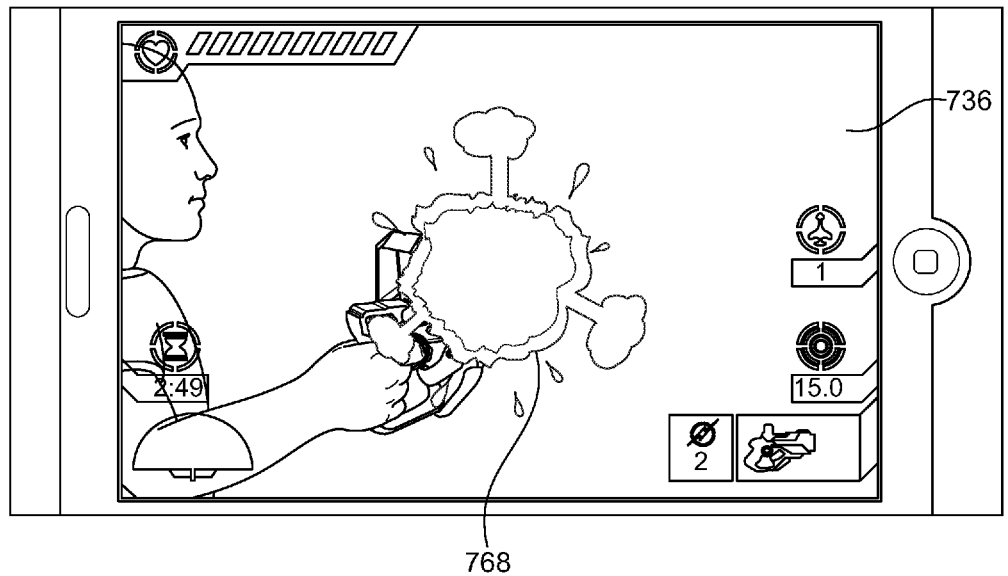
FIG. 16D is a screen shot from the display on the first apparatus during a multiplayer augmented reality game with an animation superimposed over the real-time field of view for when an opposing player is tagged.

FIG. 16D is a screen shot from the display on the first apparatus during a multiplayer augmented reality game with an animation superimposed over the real-time field of view for when an opposing player is tagged. This figure shows that when an opposing player is hit with a shot, or tagged, an explosion animation 768 is superimposed over the real-time background 736. In the exemplary game, an explosion sound is heard to correspond to the explosion animation 768. If the player receives a tag from an opposing player, the screen flashes red and a damage indicating sound is heard. However, if the player has his or her shield activated, the screen displays a shield overlay and a shield indicator sound is heard.

Figure 17A:
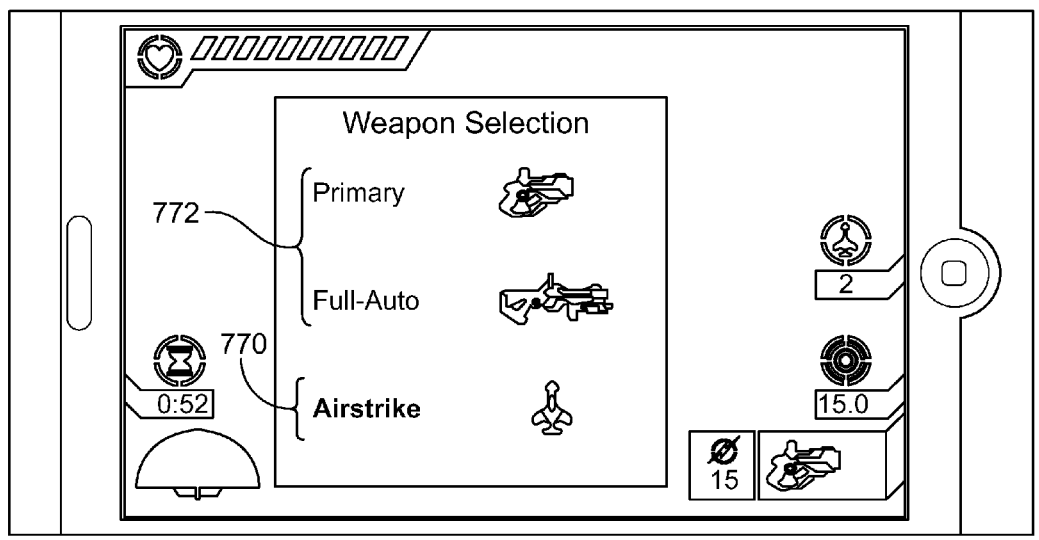
FIG. 17A is a weapon selection screen shot from the display on the first apparatus during a multiplayer augmented reality game with an airstrike chosen.
Figure 17B:
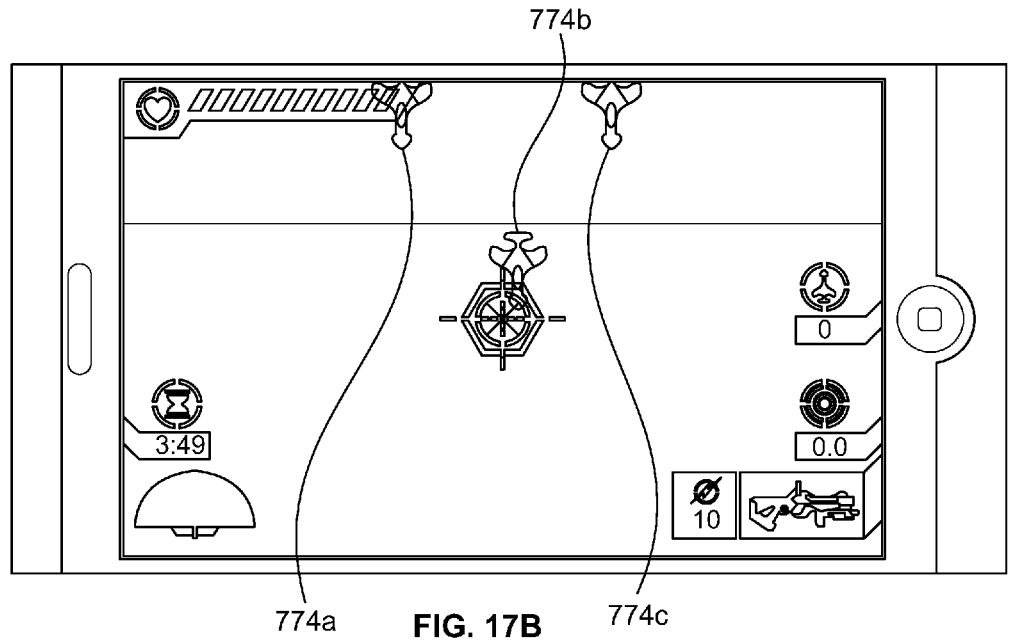
FIG. 17B is a screen shot from the display on the first apparatus during a multiplayer augmented reality game during an airstrike with a virtual airplane in range.
Figure 17C:
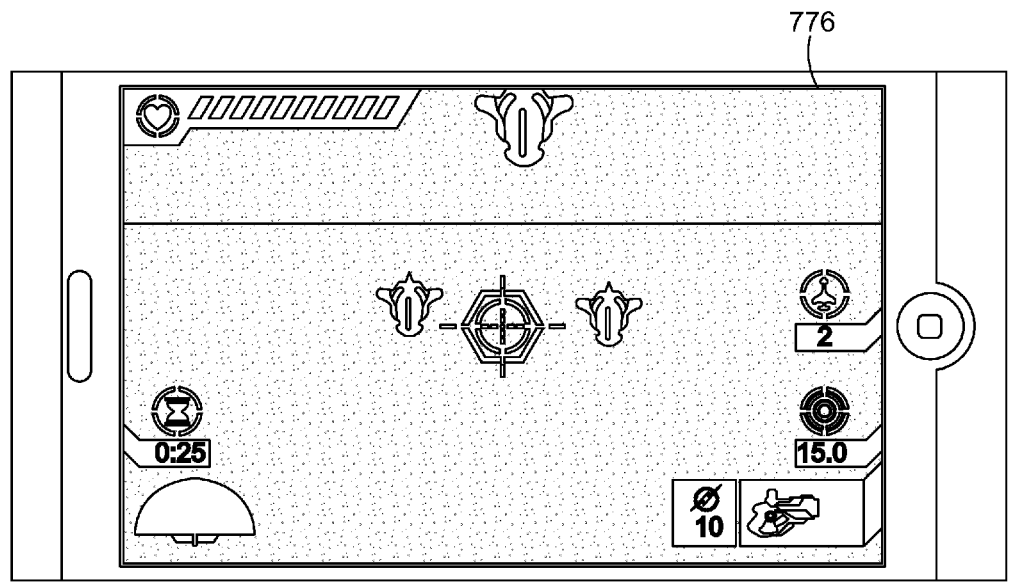
FIG. 17C is a screen shot from the display on the first apparatus during a multiplayer augmented reality game during an airstrike where the player was tagged.

FIG. 17A is a weapon selection screen shot from the display on the first apparatus during a multiplayer augmented reality game with an airstrike chosen. The selected weapon 770 is highlighted and the optional selected weapons 772 are shown faded. In this example, an augmented reality airstrike is the selected weapon 770. In the exemplary game, an airstrike involves three virtual airplanes launched to attack the player. If the player does not have a shield activated, then the player must shoot down the airplanes before the airplanes fire virtual shots that hit the player. The airplanes are mapped relative to real space, so the player must track them as they fly overhead. The player will hear the airplanes as they fly within range. FIG. 17B is a screen shot from the display on the first apparatus during a multiplayer augmented reality game during an airstrike with an enemy in range. In the exemplary game, the defending player will hear a warning over the radio before seeing the virtual airstrike attackers 774a-c come into the field of view. Note from FIG. 17B that the player is aiming the weapon upward towards the corner of the ceiling and the wall to track the overhead attack. If the player shoots one of the virtual airstrike attackers 774a-c, an appropriate animation is seen and an appropriate explosion sound is heard. The virtual airstrike attackers 774a-c must be individually shot and destroyed. A surviving airplane will shoot the player and cause damage. FIG. 17C is a screen shot from a multiplayer augmented reality game during an airstrike where the player was tagged. Note that when a player is hit, the background indicator 776 will appear as a change in background color.

While the present invention has been illustrated by a description of various embodiments and while these embodiments have been set forth in considerable detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to be preferred embodiments as would be apparent to one of ordinary skill in the art and familiar with the teachings of the present application.

What is claimed is:

1. A hand held device for an infrared shooting game having one or more participants comprising:
a shaped housing;
a first directional infrared transmitter disposed within the housing for transmitting directional IR data using a narrow light beam;
a first omni-directional field of view receiver disposed within the housing to receive IR data;
a first electronic controller disposed within the housing; and a first apparatus removably coupled to the housing, the first apparatus comprising;
  a display;
  a second electronic controller, the first electronic controller being in communications with the second electronic controller;
  a virtual shot that appears on the display superimposed over the real-time image of the field of view in response to a first communication from the first electronic controller to the second electronic controller;
  a hit animation that appears on the display superimposed over the real-time image of the field of view in response to a second communication from the first electronic controller to the second electronic controller; and
  a heads up display that appears on the display superimposed over the real-time image of the field of view in response to a third communication from the first electronic controller to the second electronic controller, the heads up display showing game-related data.

2. The hand held device of claim 1 wherein the first apparatus further comprises:
  a sensor that produces data defining the real-time spatial orientation of the first apparatus;
  a first data structure for storing the data defining the real-time spatial orientation of the first apparatus;
  a second data structure for storing data defining one or more virtual objects;
  a third data structure for storing data defining the real-time spatial orientation of the one or more virtual objects relative to the real-time spatial orientation of the first apparatus;
  a first memory for storing a real-time image of the field of view;
  a second memory for storing a real-time image of the one or more virtual objects that are positioned such that the real-time spatial orientation of the one or more virtual objects relative to the real-time spatial orientation of the first apparatus is within the field of view; and
  a third memory for storing a software program controlled by the second electronic controller that causes the image in the first memory to be shown on the display and the image in the second memory to be superimposed over the image in the first memory on the display.

3. The hand held device of claim 2 further comprising a fourth data structure for storing data defining a real-time virtual shot trajectory originating from the hand held device and in response to a first signal from the first electronic controller to the second electronic controller, the software program causes a shot image to travel across the display along the real-time virtual shot trajectory superimposed over the image shown on the display.

4. The hand held device of claim 3 wherein the one or more virtual objects travel within the display and when the shot image crosses a virtual object, the software program causes a graphical animation to appear on the display superimposed over the real-time image of the field of view.

5. The hand held device of claim 2 wherein the software program causes the one or more virtual objects to shoot a virtual shot towards the participant using the hand held device, the combination of the data in the first data structure, the second data structure and the third data structure determining whether the participant using the hand held device is hit by the virtual shot from the virtual object.

6. The hand held device of claim 1 further comprising a speaker on the first apparatus that produces sound in conjunction with a virtual shot and with an animation.

7. The hand held device of claim 1 further comprising a second apparatus removably coupled to the device, the second apparatus sending an identifying signal to the first electronic controller when coupled to the device, which causes the first electronic controller to send a third signal from the first electronic controller to the second electronic controller and wherein in response to the third signal, modifies the behavior of game play.

8. The hand held device of claim 1 further comprising a bidirectional channel facilitating communication between the first electronic controller and the second electronic controller and a touch screen display that allows user input.

9. The hand held device of claim 8 further comprising at least one game play configuration definition wherein the second electronic controller sends the game play configuration definition to the first electronic controller and modifies the game play configuration definition at the first electronic controller.

10. A hand held device for an infrared shooting game having one or more participants comprising:
  a shaped housing;
  a first directional infrared transmitter disposed within the housing for transmitting directional IR data using a narrow light beam;
  a first omni-directional field of view receiver disposed within the housing to receive IR data;
  a first electronic controller disposed within the housing; and
  a first apparatus removably coupled to the housing, the first apparatus comprising;
    a display;
    a second electronic controller, the first electronic controller being in communications with the second electronic controller;
    a sensor that produces data defining the real-time spatial orientation of the first apparatus;
    a first data structure for storing the data defining the real-time spatial orientation of the first apparatus;
    a second data structure for storing data defining one or more virtual objects;
    a third data structure for storing data defining the real-time spatial orientation of the one or more virtual objects relative to the real-time spatial orientation of the first apparatus;
    a first memory for storing a real-time image of the field of view;
    a second memory for storing a real-time image of the one or more virtual objects that are positioned such that the real-time spatial orientation of the one or more virtual objects relative to the real-time spatial orientation of the first apparatus is within the field of view; and
    a third memory for storing a software program controlled by the second electronic controller that causes the image in the first memory to be shown on the display and the image in the second memory to be superimposed over the image in the first memory on the display.

11. The hand held device of claim 10 wherein the first apparatus further comprises:
  a virtual shot that appears on the display superimposed over the real-time image of the field of view in response to a first communication from the first electronic controller to the second electronic controller;
  a hit animation that appears on the display superimposed over the real-time image of the field of view in response to a second communication from the first electronic controller to the second electronic controller; and
  a heads up display that appears on the display superimposed over the real-time image of the field of view in response to a third communication from the first electronic controller to the second electronic controller, the heads up display showing game-related data.

12. The hand held device of claim 10 further comprising a fourth data structure for storing data defining a real-time virtual shot trajectory originating from the hand held device and in response to a first signal from the first electronic controller to the second electronic controller, the software program causes a shot image to travel across the display along the real-time virtual shot trajectory superimposed over the image shown on the display.

13. The hand held device of claim 12 wherein the one or more virtual objects travel within the display and when the shot image crosses a virtual object, the software program causes a graphical animation to appear on the display superimposed over the real-time image of the field of view.

14. The hand held device of claim 10 wherein the software program causes the one or more virtual objects to shoot a virtual shot towards the participant using the hand held device, the combination of the data in the first data structure, the second data structure and the third data structure determining whether the participant using the hand held device is hit by the virtual shot from the virtual object.

15. The hand held device of claim 10 further comprising a speaker on the first apparatus that produces sound in conjunction with a virtual shot and with an animation.

16. The hand held device of claim 10 further comprising a second apparatus removably coupled to the device, the second apparatus sending an identifying signal to the first electronic controller when coupled to the device, which causes the first electronic controller to send a third signal from the first electronic controller to the second electronic controller and wherein in response to the third signal, modifies the behavior of game play.

17. The hand held device of claim 10 further comprising a bidirectional channel facilitating communication between the first electronic controller and the second electronic controller and a touch screen display that allows user input.

18. The hand held device of claim 17 further comprising at least one game play configuration definition wherein the second electronic controller sends the game play configuration definition to the first electronic controller and modifies the game play configuration definition at the first electronic controller.

19. A method for an infrared shooting game having one or more participants comprising:
providing a shaped housing;
disposing a first directional infrared transmitter for transmitting directional IR data using a narrow light beam within the housing;
disposing a first omni-directional field of view receiver to receive IR data within the housing;
disposing a first electronic controller within the housing; and
coupling a first apparatus removably to the housing, the first apparatus comprising;
providing a display;
using a second electronic controller to bidirectionally communicate with the first electronic controller;
sending a signal between the first electronic controller and the second electronic controller;
generating a virtual shot that appears on the display superimposed over the real-time image of the field of view in response to a first communication from the first electronic controller to the second electronic controller;
generating a hit animation that appears on the display superimposed over the real-time image of the field of view in response to a second communication from the first electronic controller to the second electronic controller;
generating a heads up display that appears on the display superimposed over the real-time image of the field of view in response to a third communication from the first electronic controller to the second electronic controller, the heads up display showing game-related data;
producing data defining the real-time spatial orientation of the first apparatus using a sensor;
storing the data defining the real-time spatial orientation of the first apparatus in a first data structure;
storing data defining one or more virtual objects in a second data structure;
storing data defining the real-time spatial orientation of the one or more virtual objects relative to the real-time spatial orientation of the first apparatus in a third data structure;
storing a real-time image of the field of view in a first memory;
storing a real-time image of the one or more virtual objects that are positioned such that the real-time spatial orientation of the one or more virtual objects relative to the real-time spatial orientation of the first apparatus is within the field of view in a second memory; and
storing a software program controlled by the second electronic controller that causes the image in the first memory to be shown on the display and the image in the second memory to be superimposed over the image in the first memory on the display in a third memory.

20. The method of claim 19 further comprising animating one or more virtual objects to travel within the display and shoot at the participant and storing data defining a real-time virtual shot trajectory originating from the hand held device in a fourth data structure and responding to a first signal from the first electronic controller to the second electronic controller by having the software program cause a shot image to travel across the display along the real-time virtual shot trajectory superimposed over the image shown on the display, and when the shot image crosses a virtual object, having the software program cause a graphical animation to appear on the display superimposed over the real-time image of the field of view.

* * * * *